United States Patent
Walsh et al.

(10) Patent No.: US 11,628,967 B2
(45) Date of Patent: *Apr. 18, 2023

(54) METHOD AND SYSTEM FOR FORMING PACKAGES

(71) Applicant: Graphic Packaging International, LLC, Atlanta, GA (US)

(72) Inventors: Joseph C. Walsh, Boulder, CO (US); Robert L. Conatser, Golden, CO (US); James Baxley, Arvada, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,132

(22) Filed: Oct. 12, 2021

(65) Prior Publication Data
US 2022/0024170 A1 Jan. 27, 2022

Related U.S. Application Data

(63) Continuation of application No. 16/410,202, filed on May 13, 2019, now Pat. No. 11,174,065.
(Continued)

(51) Int. Cl.
*B65D 5/10* (2006.01)
*B65D 5/60* (2006.01)
(Continued)

(52) U.S. Cl.
CPC .......... *B65D 5/103* (2013.01); *B65D 5/3628* (2013.01); *B65D 5/4208* (2013.01); *B65D 5/606* (2013.01); *B31B 2155/001* (2017.08)

(58) Field of Classification Search
CPC ......... B31B 50/64; B31B 50/72; B31B 50/10; B31B 50/26; B31B 50/645; B31B 105/00;
(Continued)

(56) References Cited

U.S. PATENT DOCUMENTS 2,095,910 A * 10/1937 Bergstein ................ B31B 50/81
53/449
2,099,257 A * 11/1937 Bergstein ............. B65D 5/4204
229/162.1
(Continued)

FOREIGN PATENT DOCUMENTS

CN 1603101 A 4/2005
CN 200939712 Y 8/2007
(Continued)

OTHER PUBLICATIONS

Notification of the First Office Action for Chinese Application No. 201980032429.X dated Dec. 13, 2021.
(Continued)

*Primary Examiner* — Dariush Seif
(74) *Attorney, Agent, or Firm* — Womble Bond Dickinson (US) LLP

(57) ABSTRACT

A method of sealing reinforced packages. The method can comprise moving an open-ended package in a downstream direction on a package conveyor by engaging the open-ended package with a chain flight of the package conveyor moving in the downstream direction. The method further can comprise forming a bag with a closed end by engaging at least a seal portion of a tail section of an open-ended tube portion of the open-ended package between the chain flight of the package conveyor and a hot plate positioned adjacent the package conveyor. The chain flight can move with the tail section in the downstream direction relative to the hot plate, which can transfer thermal energy to the tail section to at least partially form a seal along the seal portion in the tail section to at least partially form the closed end of the bag.

29 Claims, 15 Drawing Sheets

Related U.S. Application Data

(60) Provisional application No. 62/671,032, filed on May 14, 2018.

(51) Int. Cl.
  B65D 5/42 (2006.01)
  B65D 5/36 (2006.01)
  B31B 155/00 (2017.01)

(58) Field of Classification Search
  CPC . B31B 2155/001; B31B 120/40; B65B 43/04; B65B 43/08; B65B 43/10; B65B 43/46; B65D 33/02; B65D 33/25; B65D 5/08; B65D 5/42; B65D 5/56; B65D 5/103; B65D 5/3628; B65D 5/4208; B65D 5/606; B29C 57/10
  USPC ............................................................ 493/150
  See application file for complete search history.

(56) References Cited

U.S. PATENT DOCUMENTS

| | | | |
|---|---|---|---|
| 3,527,633 A | 9/1970 | Bertoglio | |
| 3,554,434 A * | 1/1971 | Anderson | B65D 33/02 383/104 |
| 3,855,907 A | 12/1974 | Johnson et al. | |
| 3,878,771 A * | 4/1975 | Malcolm | B65D 5/4608 156/251 |
| 5,746,871 A | 5/1998 | Walsh | |
| 5,783,030 A | 7/1998 | Walsh | |
| 6,332,488 B1 | 12/2001 | Walsh | |
| 6,352,096 B1 | 3/2002 | Walsh | |
| 6,637,646 B1 * | 10/2003 | Muise | B65D 5/606 229/117.27 |
| 6,796,930 B2 | 9/2004 | Walsh | |
| 6,948,615 B2 | 9/2005 | Walsh et al. | |
| 7,658,318 B2 | 2/2010 | Walsh et al. | |
| 7,717,322 B2 | 5/2010 | Walsh et al. | |
| 8,025,618 B2 | 9/2011 | Walsh et al. | |
| 8,220,701 B2 * | 7/2012 | Fontaine | B65D 43/022 229/125.17 |
| 9,751,288 B2 | 9/2017 | Walsh | |
| 9,758,275 B2 * | 9/2017 | Fitzwater | B65D 5/103 |
| 9,844,920 B2 * | 12/2017 | Walsh | B31B 70/81 |
| 9,957,080 B2 * | 5/2018 | Kastanek | B65D 5/0227 |
| 10,023,349 B2 * | 7/2018 | Fitzwater | B65D 5/02 |
| 10,179,666 B2 * | 1/2019 | Cain | B65B 35/44 |
| 10,421,572 B2 * | 9/2019 | Moncrief | B65B 21/242 |
| 11,059,255 B2 * | 7/2021 | Walsh | B31B 70/008 |
| 11,174,065 B2 | 11/2021 | Walsh et al. | |
| 2003/0024971 A1 | 2/2003 | Jones | B65D 5/10 229/109 |
| 2006/0096978 A1 * | 5/2006 | Lafferty | B65D 81/386 219/730 |
| 2011/0017812 A1 * | 1/2011 | Belko | B65D 33/2508 229/117.34 |
| 2011/0297680 A1 * | 12/2011 | Howell | B65D 75/58 220/266 |
| 2014/0128235 A1 * | 5/2014 | Walsh, Jr. | B31B 70/16 493/264 |
| 2014/0151443 A1 | 6/2014 | Walsh et al. | |
| 2014/0270592 A1 * | 9/2014 | Walsh | B65D 33/007 383/105 |
| 2015/0083789 A1 * | 3/2015 | Fitzwater | B65D 5/3628 229/117.34 |
| 2015/0353218 A1 * | 12/2015 | Köhn | B65D 33/02 53/567 |
| 2016/0176179 A1 | 6/2016 | Walsh | |
| 2016/0318274 A1 * | 11/2016 | Walsh | B29C 66/841 |
| 2016/0318275 A1 * | 11/2016 | Walsh | A47G 21/00 |
| 2016/0325877 A1 * | 11/2016 | Kastanek | B65D 5/3628 |
| 2017/0015079 A1 * | 1/2017 | Walsh | B31B 70/008 |
| 2017/0050758 A1 * | 2/2017 | Fitzwater | B65D 33/02 |
| 2017/0166384 A1 | 6/2017 | Walsh et al. | |
| 2018/0037360 A1 | 2/2018 | Walsh et al. | |
| 2018/0050511 A1 | 2/2018 | Walsh et al. | |
| 2018/0169989 A1 | 6/2018 | O'Hagan et al. | |
| 2018/0186541 A1 * | 7/2018 | Jones | B31B 50/262 |
| 2019/0047745 A1 * | 2/2019 | Walsh | B31B 50/26 |
| 2019/0344922 A1 * | 11/2019 | Walsh | B29C 66/836 |

FOREIGN PATENT DOCUMENTS

| | | |
|---|---|---|
| CN | 103085317 A | 5/2013 |
| CN | 106584921 A | 4/2017 |
| CN | 107848723 A | 3/2018 |
| FR | 1048714 A | 12/1953 |
| GB | 837 420 A | 6/1960 |
| GB | 1193336 A | 5/1970 |
| JP | H05138770 A | 6/1993 |
| JP | 2006-240670 A | 9/2006 |
| KR | 10-2012-0101632 A | 9/2012 |
| WO | WO 2016/176540 A1 | 11/2016 |

OTHER PUBLICATIONS

International Search Report and Written Opinion for PCT/IB2019/053950 dated Sep. 20, 2019.
Issue Notification for U.S. Appl. No. 16/410,202 dated Oct. 27, 2021.
Response to Rule 312 Communication for U.S. Appl. No. 16/410,202 dated Oct. 21, 2021.
Amendment Under 37 C.F.R. § 1.312 for U.S. Appl. No. 16/410,202 dated Oct. 12, 2021.
Issue Fee Transmittal Form for U.S. Appl. No. 16/410,202 dated Oct. 12, 2021.
Notice of Allowance and Fee(s) Due for U.S. Appl. No. 16/410,202 dated Aug. 26, 2021.
Supplementary European Search Report for EP 19 80 4213 dated Feb. 14, 2022.

* cited by examiner

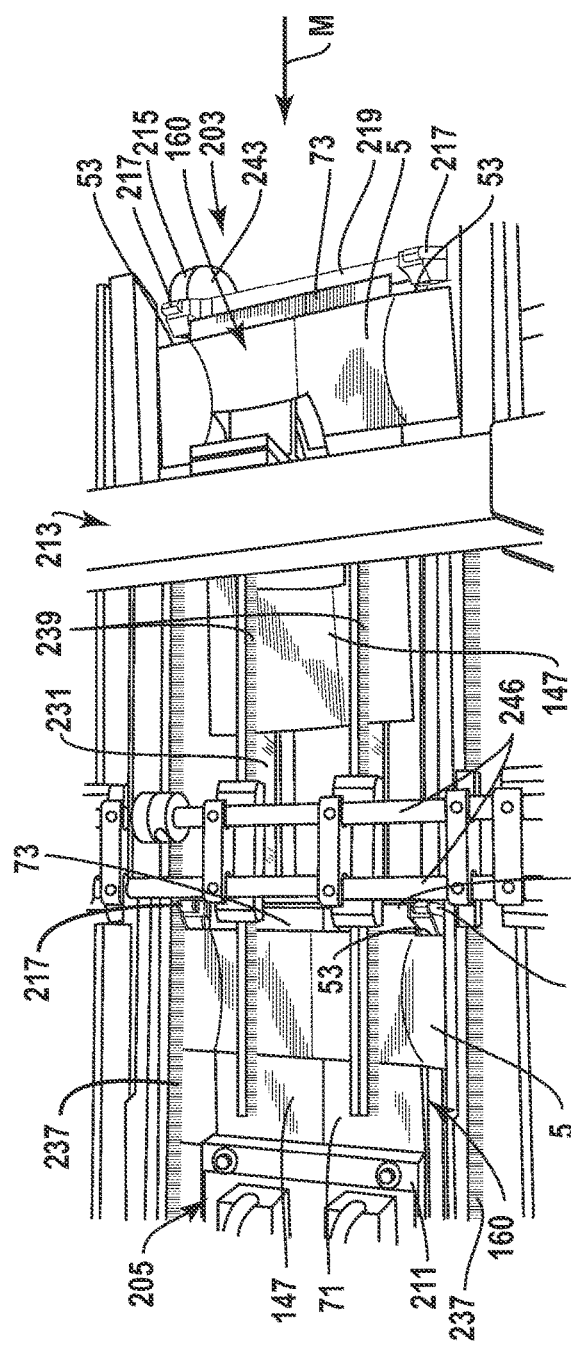
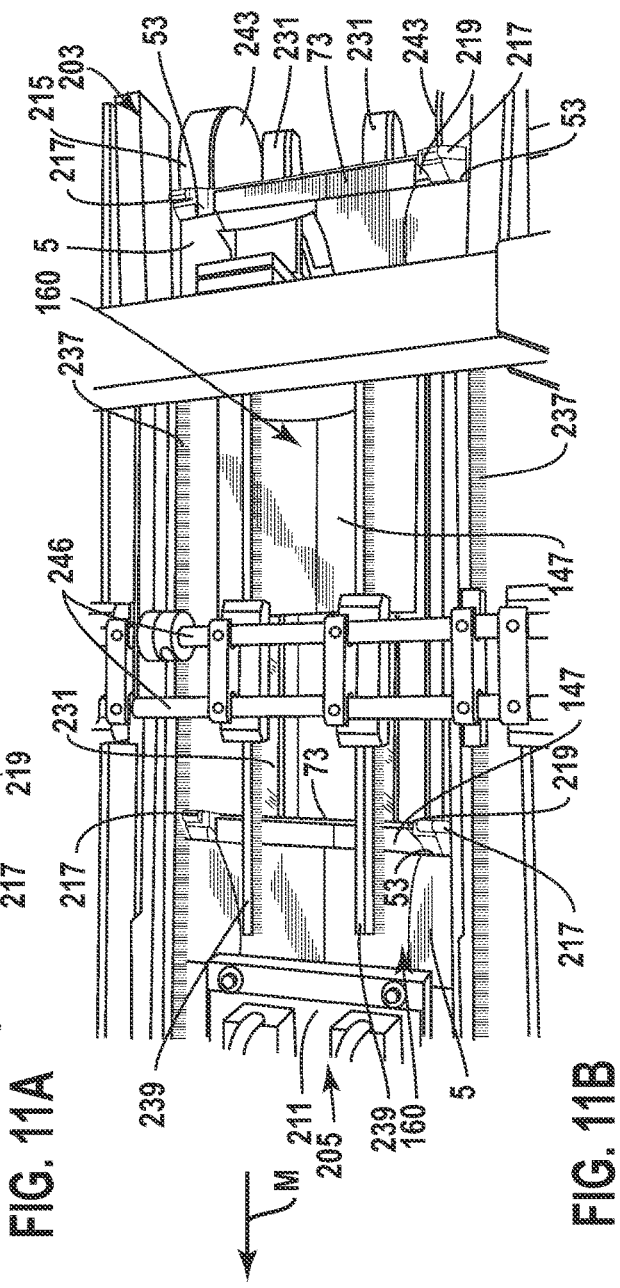
FIG. 11A
FIG. 11B

METHOD AND SYSTEM FOR FORMING PACKAGES

CROSS-REFERENCE TO RELATED APPLICATIONS

This application is a continuation of U.S. patent application Ser. No. 16/410,202, filed on May 13, 2019, which claims the benefit of U.S. Provisional Patent Application No. 62/671,032, filed on May 14, 2018.

INCORPORATION BY REFERENCE

The disclosures of U.S. patent application Ser. No. 16/410,202, which was filed on May 13, 2019, U.S. Provisional Patent Application No. 62/671,032, which was filed on May 14, 2018, U.S. Provisional Patent Application No. 62/179,172, which was filed on Apr. 29, 2015, and U.S. patent application Ser. No. 15/142,103, which was filed on Apr. 29, 2016, are hereby incorporated by reference for all purposes as if presented herein in their entirety.

BACKGROUND OF THE DISCLOSURE

The present disclosure generally relates to reinforced packages for holding products and to methods of forming the packages. More specifically, the present disclosure is directed to methods and systems for forming the packages including a reinforcing sleeve for supporting a bag.

Bags, such as paper or plastic bags, traditionally have been used for the packaging and transport of products from bulk materials such as rice or sand to larger items. Bags generally are cheap and easy to manufacture and can be formed in different configurations and sizes, and can be used for storage and transport of a wide variety of products. In particular, in the Fast Food industry, bags are frequently used for packaging of prepared food items, such as sandwiches, etc. Currently, there is a growing demand for bags or similar packages for use in packaging various products, including sandwiches, French fries, and other prepared food items, that a worker can easily open, such as with one hand, and have the bag supported in an open configuration to enhance the efficiency of packaging of such products. However, it is equally important that the costs of such bags necessarily must be minimized as much as possible. While various bag designs including reinforcing or supporting materials have been developed, often, the manufacture of such specialty bags having reinforcing layers or materials supplied thereto has required multiple stages or operations, which can significantly increase the cost of manufacture of such bags.

SUMMARY OF THE DISCLOSURE

In general, one aspect of the disclosure is directed to a method of sealing reinforced packages. The method can comprise moving an open-ended package in a downstream direction on a package conveyor. The open-ended package can include a reinforcement sleeve attached to an open-ended tube portion so that a tail section of the open-ended tube portion extends from an edge of the reinforcement sleeve. The open-ended sleeve can be oriented so that the tail section is disposed upstream from the reinforcement sleeve. The moving the open-ended package can comprise engaging the open-ended package with a chain flight of the package conveyor moving in the downstream direction. The method further can comprise forming a bag with a closed end by engaging at least a seal portion of the tail section of the open-ended tube portion between the chain flight of the package conveyor and a hot plate positioned adjacent the package conveyor. The chain flight can move with the tail section in the downstream direction relative to the hot plate. The forming the bag can comprise transferring thermal energy from at least the hot plate to the tail section during the engaging at least the seal portion of the tail section between the chain flight and the hot plate to at least partially form a seal along the seal portion in the tail section to at least partially form the closed end of the bag.

In another aspect, the disclosure is generally directed to a system for sealing reinforced packages. The system can comprise a package conveyor comprising a chain flight moving in a downstream direction. The chain flight can engage an open-ended package received by the package conveyor and can move the open-ended package in the downstream direction. The open-ended package can include a reinforcement sleeve attached to an open-ended tube portion so that a tail section of the open-ended tube portion extends from an edge of the reinforcement sleeve. The system further can comprise a hot plate assembly comprising a hot plate positioned adjacent at least a portion of the package conveyor so that at least a seal portion of the tail section of the open-ended tube portion is engaged between the chain flight and the hot plate when the package conveyor moves the open-ended package in the downstream direction. The hot plate can be at least partially heated for transferring thermal energy to the tail section for at least partially forming a seal in the tail section.

In another aspect, the disclosure is generally directed to at least a package conveyor and a hot plate assembly that cooperate to at least partially form a reinforced package with a closed end from an open-ended package. The package conveyor can comprise a pusher lug and a chain flight moving in a downstream direction, the package conveyor receiving an open-ended package for engaging the pusher lug with at least a portion of the open-ended package for moving the open-ended package in the downstream direction. The hot plate assembly comprising a hot plate positioned adjacent at least a portion of the package conveyor so that at least a portion of a tail section of an open-ended tube portion of the open-ended package is engaged between the chain flight and the hot plate when the package conveyor moves the open-ended package in the downstream direction. The hot plate being at least partially heated for transferring thermal energy to the tail section for forming at least partially a seal in the tail section.

In another aspect, the disclosure is generally directed to a method of sealing reinforced packages. The method comprises moving an open-ended package in a downstream direction on a package conveyor. The open-ended package including a reinforcement sleeve attached to a tube portion so that a tail section of the tube portion extends from an edge of the reinforcement sleeve and comprises a seal portion. The moving the open-ended package comprising engaging the open-ended package with a flight of the package conveyor moving in the downstream direction. The method comprises forming a bag with a closed end by engaging at least the seal portion of tube portion between the flight of the package conveyor and a heating element positioned adjacent the package conveyor. The flight moving with the tail section in the downstream direction relative to the heating element. The forming the bag comprising transferring thermal energy from at least the heating element to the tail section to at least partially form a seal along the seal portion in the tail section to at least partially form the closed end of the bag.

In another aspect, the disclosure is generally directed to a system for sealing reinforced packages. The system comprising a package conveyor comprising a flight moving in a downstream direction. The flight engaging an open-ended package received by the package conveyor and moving the open-ended package in the downstream direction. The open-ended package including a reinforcement sleeve attached to a tube portion so that a tail section of the tube portion extends from an edge of the reinforcement sleeve and comprises a seal portion. A heating assembly comprises a heating element positioned adjacent at least a portion of the package conveyor so that at least the seal portion of the tube portion is engaged between the flight and the heating element when the package conveyor moves the open-ended package in the downstream direction. The heating element is at least partially heated for transferring thermal energy to the tail section for at least partially forming a seal in the tail section.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

FIGS. 11A and 11B are schematic perspective views showing the engagement of the carrier flight of FIG. 9 with a package and moving the package on the conveyor assembly of FIG. 10 according to the exemplary embodiment of the disclosure.

Corresponding parts are designated by corresponding reference numbers throughout the drawings.

DETAILED DESCRIPTION OF THE EXEMPLARY EMBODIMENTS

The present disclosure generally relates to a system and method of forming reinforced packages for holding products such as food products or other articles. Packages according to the present disclosure can accommodate articles of any shape. The packages can comprise a bag or liner comprising a relatively flexible material attached to a reinforcing construct comprising a relatively rigid material (e.g., paperboard). The bags can generally be made from a paper, plastic, laminate, or other stock material and can be attached to the reinforcing construct that can be located between the opened end and sealed or closed end of the bag. In one embodiment, the bags comprise polyethylene material or any other suitable heat-sealable material. The reinforcing construct can be of varying widths and can extend about or over the closed ends of the bags, in some embodiments enclosing such closed ends, and will provide support for the bags upon loading with a product or article or series of articles therein. In some embodiments, the reinforcing constructs can be folded with their bags into a configuration supporting the bags in a freestanding, upright, and opened condition for ease of loading.

Figure 1:
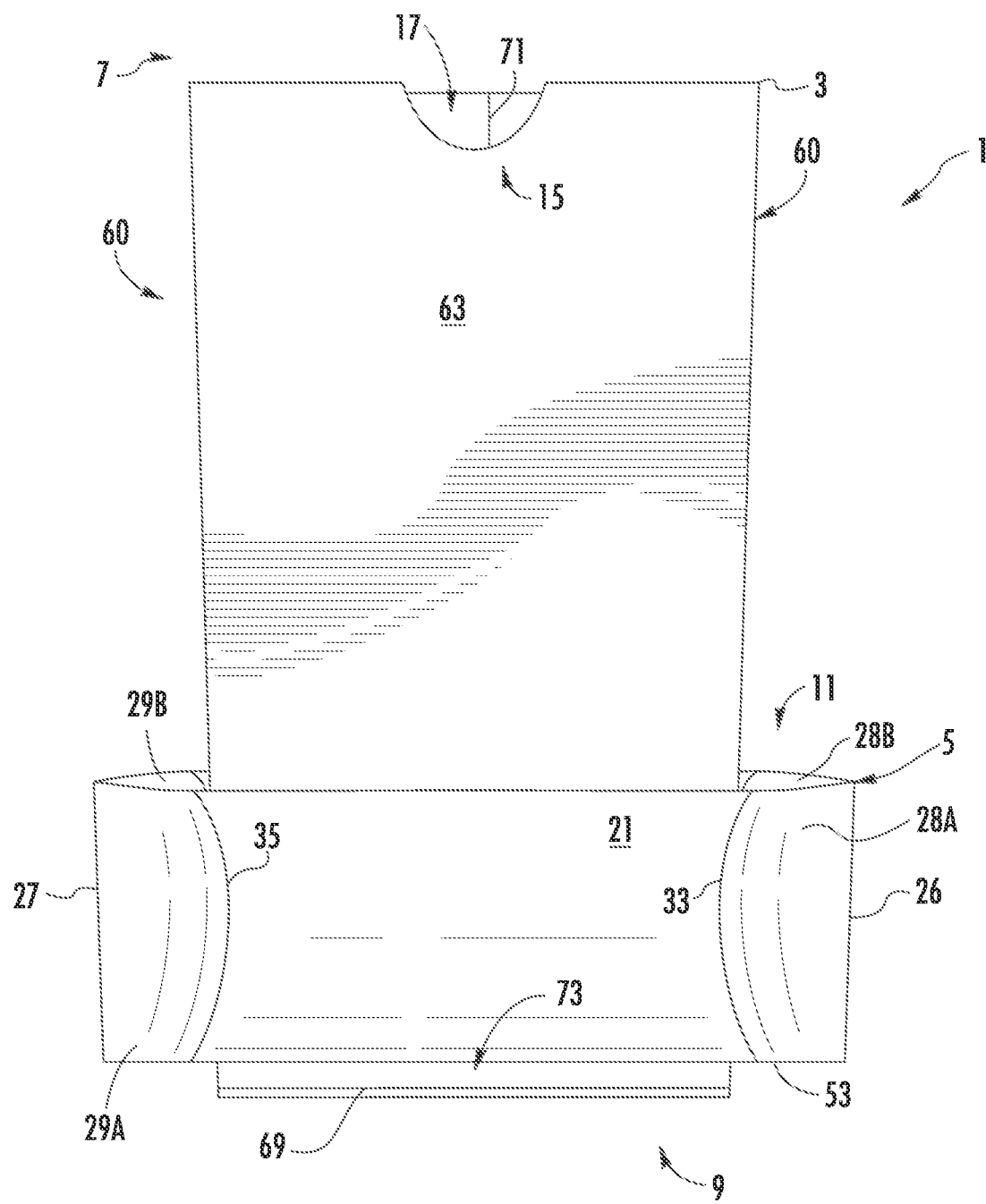
FIG. 1 is a perspective side view of a reinforced package in a flattened condition formed according to a system and method of forming reinforced packages according to an exemplary embodiment of the disclosure
Figure 3:
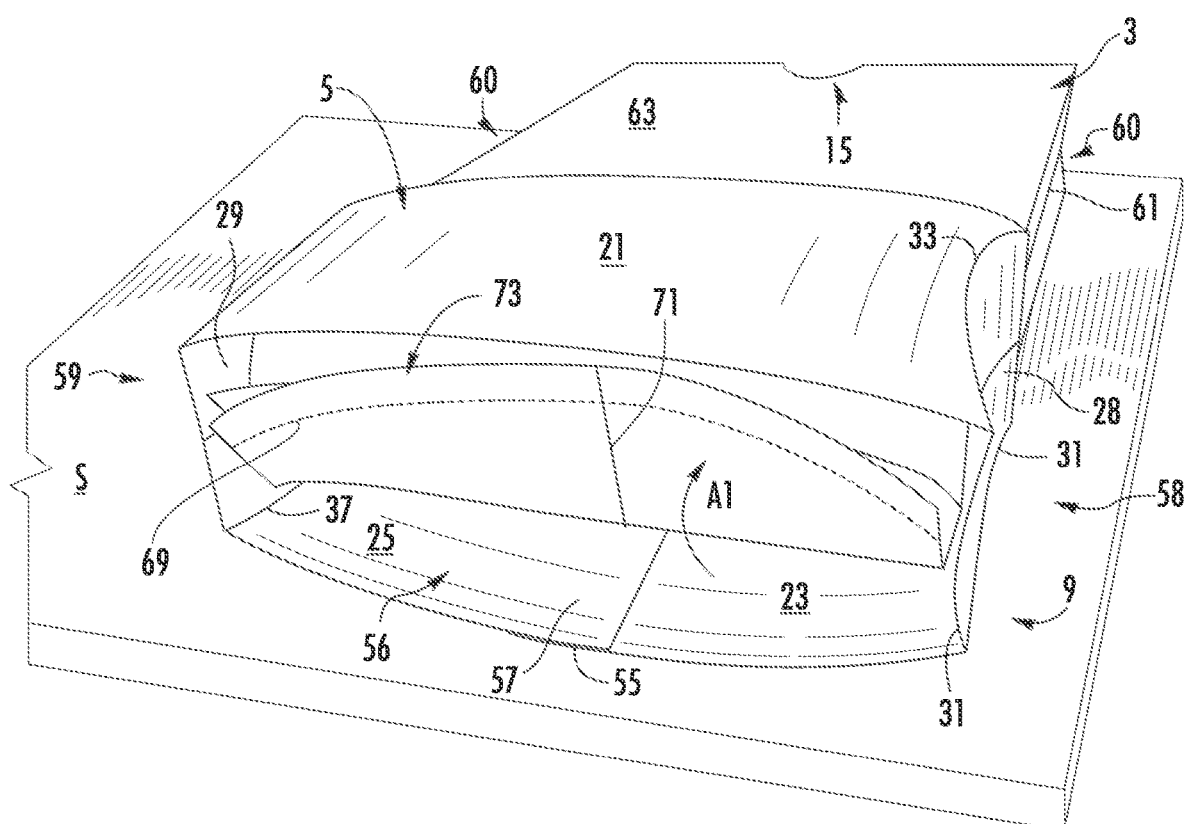
FIGS. 3 and 4 are perspective views of the reinforced package of FIG. 1 in an opened condition.
Figure 4:
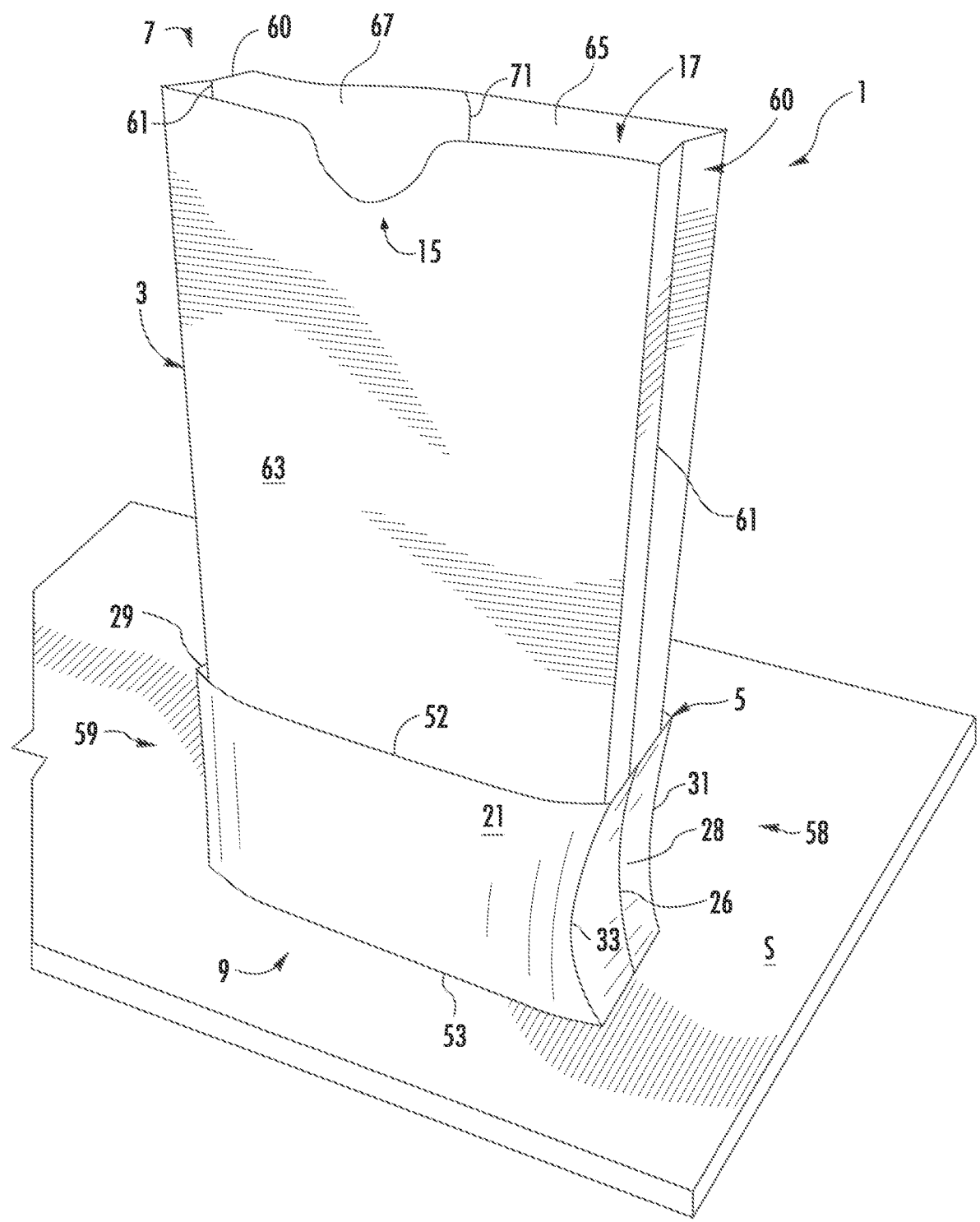

FIG. 1 illustrates a reinforced package generally indicated at 1 that can be formed by one embodiment of the system and method of the present disclosure. The package 1 includes a bag 3 and a reinforcing construct or sleeve 5 attached to the bag 3. The bag has an open end 7, a closed end 9, and an interior space 17 for holding a product. In one embodiment, the bag 3 has gusseted sides 60 including a fold line 61 (FIGS. 3 and 4) extending the length of the bag on each side to facilitate forming the gusseted side. The gussets 60 can extend between a central portion 63 (e.g., the front of the bag 3) and respective marginal portions 65, 67, which can form the back of the bag 3. In the illustrated embodiment, the marginal portions 65, 67 can be at least partially overlapped with one another and adhered to one another to form a longitudinal seam 71 extending along the height of the bag 3 (FIG. 4). The interior space 17 may be accessible through a notch 15 in the bag 3. The reinforcing sleeve 5 is configured to at least partially receive a portion 11 of the closed end 9 of the bag 3. Alternatively, the reinforcing sleeve 5 could be positioned to extend around the middle portion or top portion of the bag 3 without departing from the disclosure.

As shown in FIG. 1, the bag 3 can include a tail section 73 that extends outwardly from the sleeve 5 opposite to the open end 7 of the bag 3. As described in more detail below, the walls (e.g., the gussets 60, the central portion 63, and the marginal portions 65, 67) can been heat sealed and/or adhered together along the tail section 73 to at least partially form a transverse seal or seam 69 that at least partially forms the closed end 9 of the bag 3.

Figure 2:
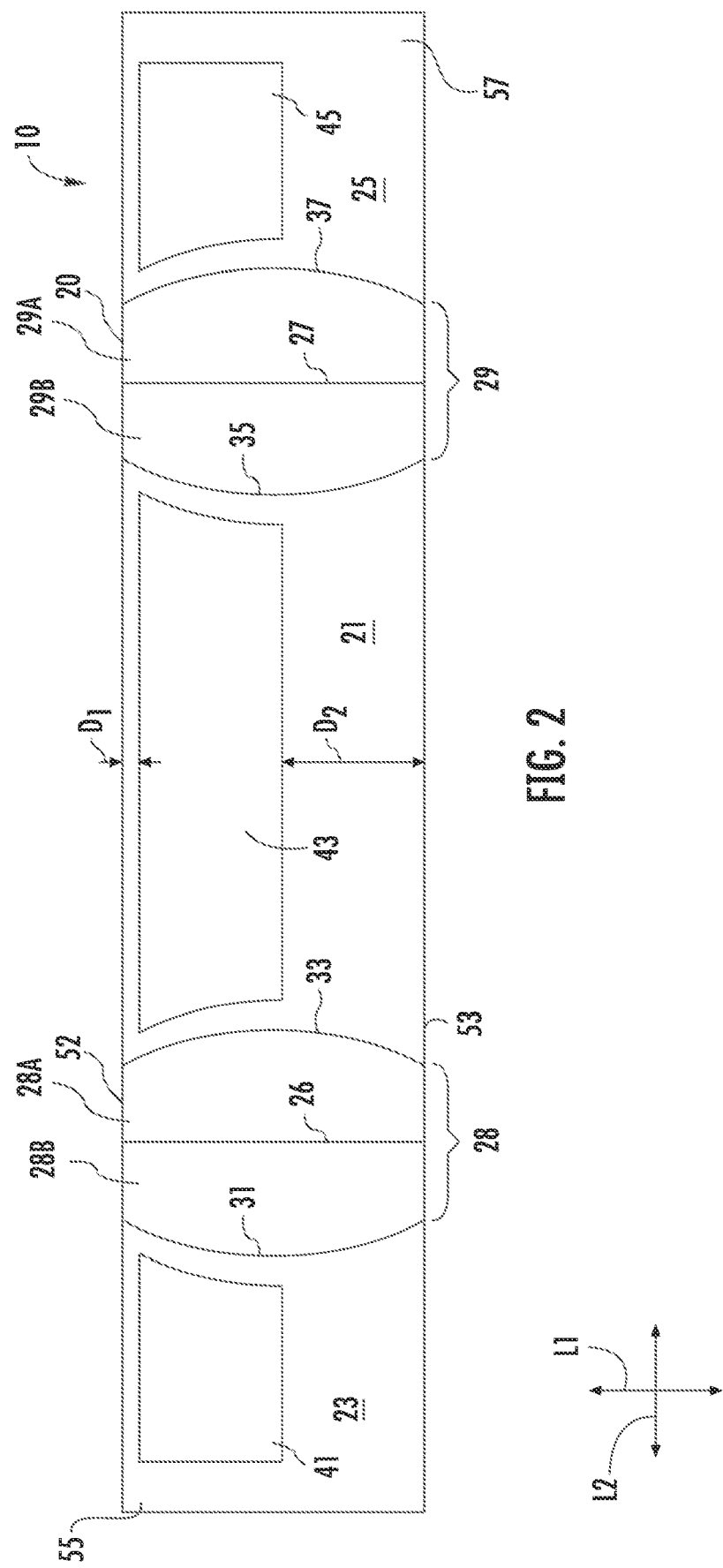
FIG. 2 is a plan view of a blank for forming a reinforcing construct of the reinforced package of FIG. 1.

FIG. 2 illustrates a blank 10 for forming the reinforcing sleeve 5. The blank has a lateral axis L1 and a longitudinal axis L2. In the illustrated embodiment, the blank 10 has a front panel 21 foldably connected to a first side panel 28 at a first arcuate fold line 33. The first side panel 28 includes two individual panel portions 28A, 28B foldably connected to one another at a lateral fold line 26. A first back panel 23 is foldably connected to the first side panel 28 at a second arcuate fold line 31. A second side panel 29 is foldably connected to the front panel 21 at a third arcuate fold line 35. The second side panel 29 includes two individual panel portions 29A, 29B foldably connected to one another at a lateral fold line 27. A second back panel 25 is foldably connected to the second side panel 29 at a fourth arcuate fold line 37. In the illustrated embodiment, the arcuate fold lines 31, 33 are spaced apart from the lateral fold line 26 and are concave with respect to the lateral fold line 26. Similarly, the arcuate fold lines 35, 37 are spaced apart from the lateral fold line 27 and are concave with respect to the lateral fold line 27. In alternative embodiments, the blank 10 can have alternative panel, fold line, and/or panel portion arrangements. U.S. patent application Ser. No. 13/826,937, filed Mar. 14, 2013, is incorporated by reference herein for all purposes, and illustrates various reinforced packages including various reinforcing constructs 5, blanks 10, and bags 3 that can be formed from the method and system of the present disclosure.

In the illustrated embodiment, the blank 10 can include one or more adhesive regions 41, 43, and 45 on the first back panel 23, front panel 21, and/or second back panel 25, respectively, for receiving adhesive and being fixedly attached to an exterior surface of the bag 3. Furthermore, the blank 10 has a first edge 52 and a second edge 53 extending in the longitudinal direction L2. In one embodiment, the adhesive regions 41, 43, 45 are separated from the first edge 52 by a first distance D1 and are separated from the second edge 53 by a second distance D2. In one embodiment, the first distance D1 is less than the second distance D2. The first and second side panels 28, 29 and regions separate from the adhesive regions 41, 43, 45 may be generally free from adhesive in some embodiments, or may include adhesive in alternative embodiments. Additionally, the first and second distances D1, D2, adhesive regions 41, 43, 45, and/or edges 52, 53 can be otherwise arranged, shaped, modified, or omitted without departing from the scope of this disclosure. For example, the first distance D1 and the second distance D2 could be generally equal or the first distance D1 could be greater than the second distance D2.

Generally, the blank 10 may be folded about fold lines 26, 27 to create the reinforcing sleeve 5. For example, distal ends 55, 57 of the first and second back panels 23, 25 may be overlapped, and the sleeve 5 attached to the bag 3 as illustrated in FIGS. 1, 3, and 4. In one embodiment, the glue regions or another adhesive can extend into one or both of the distal ends 55, 57 so that the overlapped portions of the back panels 23, 25 are adhered to one another when the reinforcement sleeve 5 is formed. The individual panel portions 28A, 28B, 29A, and 29B may be in face-to-face registration in a first, non-erect position of the bag 3 as illustrated in FIG. 1. The first, non-erect position illustrated reduces and/or minimizes a volume of the interior space 17 such that the package 1 is in a non-erect or flattened state. The non-erect state may facilitate easy stacking of a plurality of packages into, for example, a shipment container and subsequent organization at a destination facility. The individual panel portions 28A, 28B, 29A, and 29B may be flexed or positioned to form first and second sides 58, 59 of the package 1 in a second, erect position of the bag 3 as illustrated in FIGS. 3 and 4. The second, erect position illustrated increases and/or maximizes a volume of the interior space 17 such that the package 1 is in an erect or self-supporting state. The tail section 73, including the closed end 9, of the bag 3 can extend upwardly into an interior 56 of the sleeve 5 in the direction of arrow A1 while the package is in the erect state (FIG. 3). Furthermore, the bottom edge 53 forms a support when the package 1 is in the erect state for contacting a surface S (FIG. 4). The support formed of the bottom edge 53 maintains the package in an upright position on the surface S. As further illustrated in FIGS. 3 and 4, the gusseted sides 60 of the bag 3 may be maintained extended when the package 1 is in the erect state. Other intervening states of the package 1 including intermediate states whereby the package 1 is not fully erected are also applicable according to some embodiments. Furthermore, additional reinforcing sleeves of differing configurations are also applicable according to some embodiments. The reinforced package 1 may be otherwise shaped, arranged, and configured without departing from the disclosure.

Figure 5:
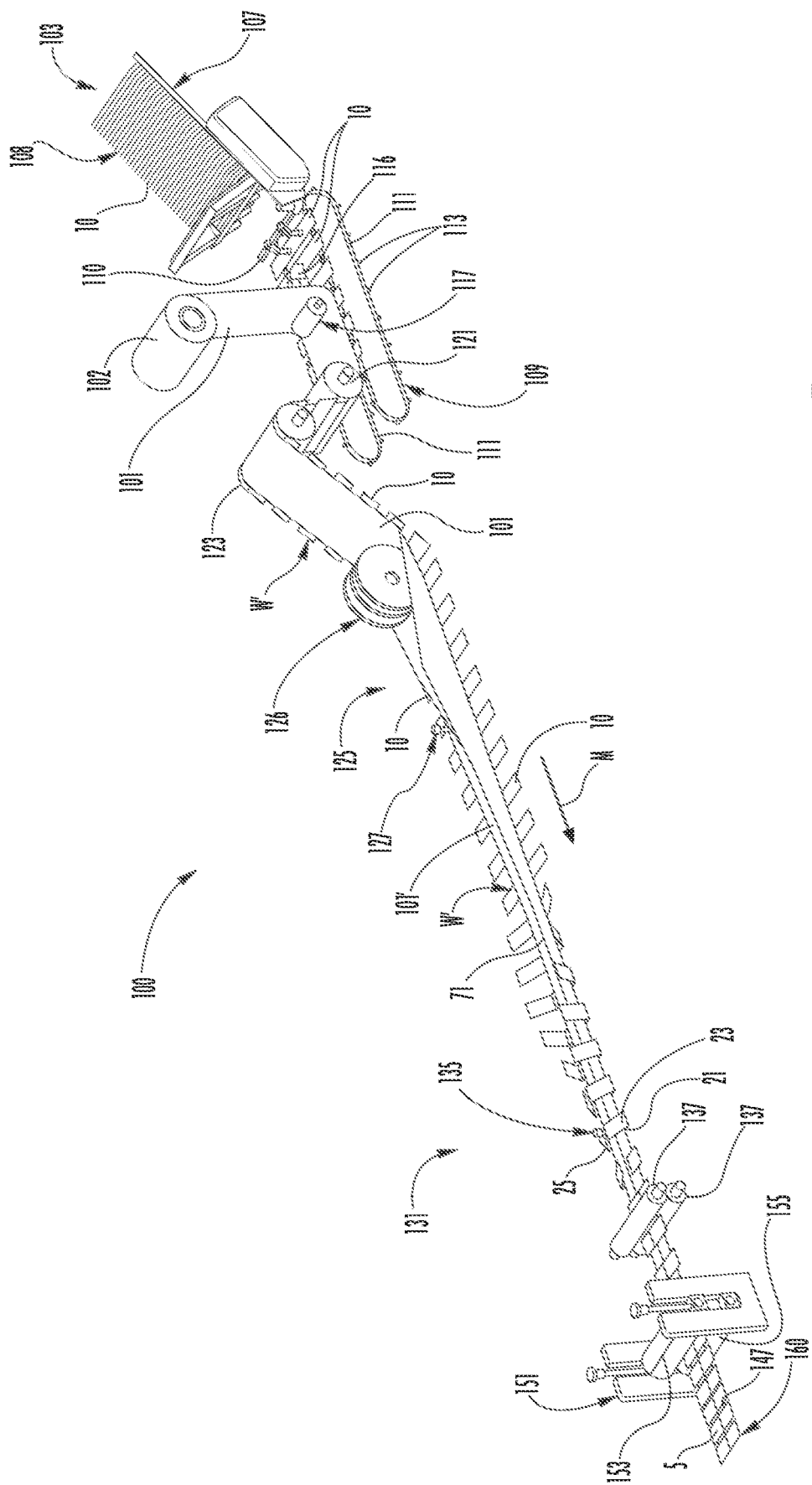
FIG. 5 is a schematic illustration of a system and method of forming open-ended packages according to the exemplary embodiment of the disclosure

FIG. 5 generally illustrates an example embodiment of a system and method 100 for forming the reinforced packages (e.g., reinforced packages 1) in accordance with the disclosure. In the illustrated embodiment, the packaging system 100 attaches a web of material 101 for forming the bags 3 of the packages 1 to the blanks 10, and the attached blanks and web move through the packaging system 100 from an upstream end 103 to a downstream end 105 generally in a machine direction M (e.g., the downstream direction), and are formed into the individual packages by various portions and components of the system as discussed further below. The system 100 can be similar or identical to the systems disclosed in U.S. patent application Ser. No. 15/142,103, filed Apr. 29, 2016, which is incorporated by reference herein for all purposes. Alternatively, the reinforced packages 1 could be otherwise formed without departing from the disclosure.

As illustrated in FIG. 5, in the system and method 100 for manufacturing reinforced packages 1, the web of bag material 101, which can include preprinted or unprinted paper, polyethylene, laminates, or other material including flexible and heat-sealable materials, for example, is fed from a roll or supply 102. In one embodiment, the bag material 101 can be preprinted with various designs, lettering, labels and/or other graphics and can have a heat sealable coating (e.g., polyethylene) on a surface (e.g., the surface that extends along the interior of the bag 3). In other embodiments, the bag material 101 can be perforated, printed roll stock that can include patterned adhesive that is positioned to facilitate forming the web 101 into bags 3 in the formed packages 1.

In one embodiment, a carton feeder 107 is positioned at the upstream end 103 of the system 100 and includes a stack 108 of carton blanks 10 that are fed to a blank conveyor 109. As illustrated in FIG. 5, the carton feeder 107 is a pick and place type carton feeder that includes an arm 110 with suction cups or any other suitable actuator for holding a blank 10 and moving the blank from the stack 108 to the blank conveyor 109. Alternatively, the carton feeder could comprise other types of feeders such as mechanisms that convey blanks 10 directed from a blank cutting station, or any other suitable types of feeders or other mechanisms without departing from the disclosure.

As shown in FIG. 5, the blank conveyor 109 includes two spaced apart lug belts or tracks 111 with lugs 113 for engaging a series of blanks 10 and conveying the blanks in the machine direction M. In the illustrated embodiment, the lug belts 111 can be endless belts, each with a plurality of the lugs 113 spaced along the respective belt. In one embodiment, the lugs 113 can be spaced on the lug belts 111 by approximately the height of the bags 3 in the reinforced packages 1. The blank conveyor 109 receives the blanks 10 from the carton feeder 107 and moves the series of blanks 10 from the carton feeder 107 to be glued and attached to the bag material 101. In the illustrated embodiment, an adhesive applicator 116 can apply adhesive to the blanks 10 (e.g., at the adhesive region 43), and the web of material 101 can be unrolled from the roll 102 over one or more rollers and directed to move in the machine direction over (e.g., generally parallel to) the lug belts 111 so that the web of material 101 can be brought into contact with the blanks 10. In one embodiment, a compression nip roller 117 can be positioned downstream from the adhesive applicator 116 over the web of material 101 and an opposing nip roller or other surface (not shown) can be disposed below the blanks 10 so that the nip rollers can receive the web of material 101 and the blanks 10 and press the web of material 101 against the blanks 10 to adhesively attach the web to the blanks via the adhesive applied by the adhesive applicator 116, for example. In one embodiment, the nip roller 117 and the opposing roller can be disposed between the lug belts 111 so that the lugs 113 can pass by the rollers. The blank 10 can be attached to the web 101 by other suitable mechanisms without departing from the disclosure.

In one embodiment, as schematically shown in FIG. 5, the web 101 with blanks 10 attached (hereinafter the attached web W') travels from the blank conveyor 109 through a series of rollers 121, 123 and to a tube forming assembly 125 of the system 100. The tube forming assembly 125 can include web folding features for forming the web of material 101 into an open-ended tube 101'. In one embodiment, the tube forming assembly 125 can include a forming roll 126 and other guide features (not shown) that form and shape the web 101 into the tube 101' having the side gussets 60 and fold lines 61 (FIGS. 3 and 4). In the illustrated embodiment, the marginal portions 65, 67 can be directed to fold upwardly and inwardly over and then to overlap one another while the gusset portions 60 are formed between the central portion 63 and the overlapped marginal portions 65, 67. A web adhesive applicator 127 can apply adhesive to the web 101 as the web is being formed into the tube 101'. The adhesive 72 can be applied to one or both of the marginal portions 65, 67 by the adhesive applicator 127 as they are overlapped to form a longitudinal seam 71 in the tube 101' (FIGS. 1, 3, and 4). The seam 71 could be otherwise formed without departing from the disclosure. Further, the tube forming assembly 125 could be otherwise configured without departing from the disclosure.

In one embodiment, the attached web W' moves from the tube forming assembly 125 to a carton forming assembly 131 of the system 100. In one embodiment, the carton forming assembly 131 includes carton folding features (not shown) that position the various flaps and panels of the blank 10. In addition, the system 100 can include folders (not shown) for breaking the fold lines of the blank 10 (e.g., the arcuate fold lines 31, 33, 35, 37) between the tube forming assembly 125 and the carton forming assembly 131. In one embodiment, the carton forming assembly 131 includes a carton adhesive applicator 135 that applies adhesive to the blank 10 so that panels (e.g., the first back panel 23 and the second back panel 25) can be folded (e.g., along fold lines 26, 27), overlapped, and adhered to form the blank 10 into the reinforcement sleeve 5 as the attached web W' moves through the carton forming assembly 131. Additionally, the back panels 23, 25 can be pressed against the tube (e.g., by nip rollers 137) so that an adhesive applied at adhesive regions 41, 45 (FIG. 2) can attach the back panels to the tube. In one embodiment, the back panels 23, 25 can at least partially overlap and can be adhered to one another. The carton forming assembly 131 could be otherwise configured without departing from the disclosure.

As shown in FIG. 5, the system 100 includes a cutting assembly 151 with one or more cutting features downstream from the carton forming assembly 131. In the illustrated embodiment, the cutting assembly is a rotary cutting assembly 151 that includes a cutting roller 153 and a base roller 155 that cut the attached web W' into open-ended packages 160 including the sleeves 5 attached to respective open-ended tube portions 147. In one embodiment, the cutting roller 153 can have an edge 157 or other cutting feature that is configured to cut the tube 101'. The attached web W' is cut and separated into the open-ended packages 160 by cutting the web material 101 at the location corresponding to the tail section 73 of the open-ended package 160 and at the location corresponding to the top edge 7 of what will be the subsequent open-ended package 160. In the illustrated embodiment, the cut is made in the tube to form the tail section 73 extending outwardly from the sleeve 5, past the bottom edge 53 so that the tail section 73 is exterior to the sleeve 5 (FIG. 1) at an upstream end of the respective open-ended package 160. After the cut, the open-ended package 160, including the sleeve 5 and the open-ended tube portion 147 having an open top end 7 and an open bottom end at the tail section 73, is now separated from the remainder of the attached web W'. The attached web W' can be cut and formed into the open-ended packages 160 by other mechanisms without departing from the disclosure. Further, the rotary cutting assembly 151 could be otherwise shaped, arranged, and/or configured without departing from the disclosure.

Figure 6:
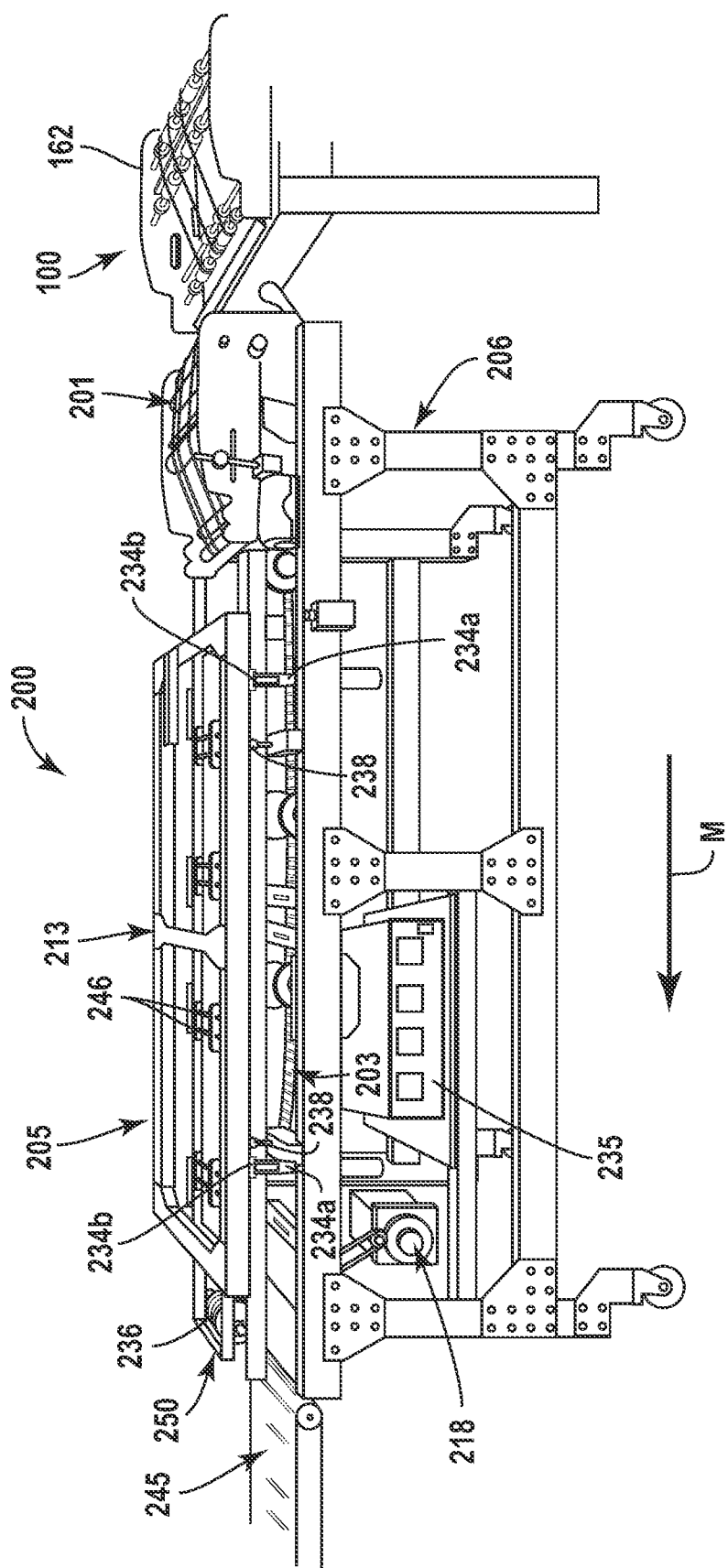
FIGS. 6 and 7 are schematic perspective views of a system for sealing the packages formed by the system of FIG. 5 according to the exemplary embodiment of the disclosure.

In an exemplary embodiment, once the open-ended packages 160, with the sleeves 5 and the open-ended tube portions 147, are formed by the system 100, the open-ended packages 160 can be passed to the sealing system 200 (FIGS. 6-15) for forming the transverse seal 69 in the tail section 73 to form the open-ended tube portion 147 into the bag 3 for each of the reinforced packages 1. For example, the open-ended packages 160 can be passed directly from the system 100 to the sealing system 200 by one or more conveyors such as a belt conveyor 162 (FIG. 6). Alternatively, the open-ended packages 160 can be stacked and can be stored and/or transported to the sealing system 200 where the stacked open-ended packages 160 can be introduced to the sealing system 200 by a feeder (not shown), which can be similar to the a carton feeder 107 of the system 100 (FIG. 5).

Figure 7:
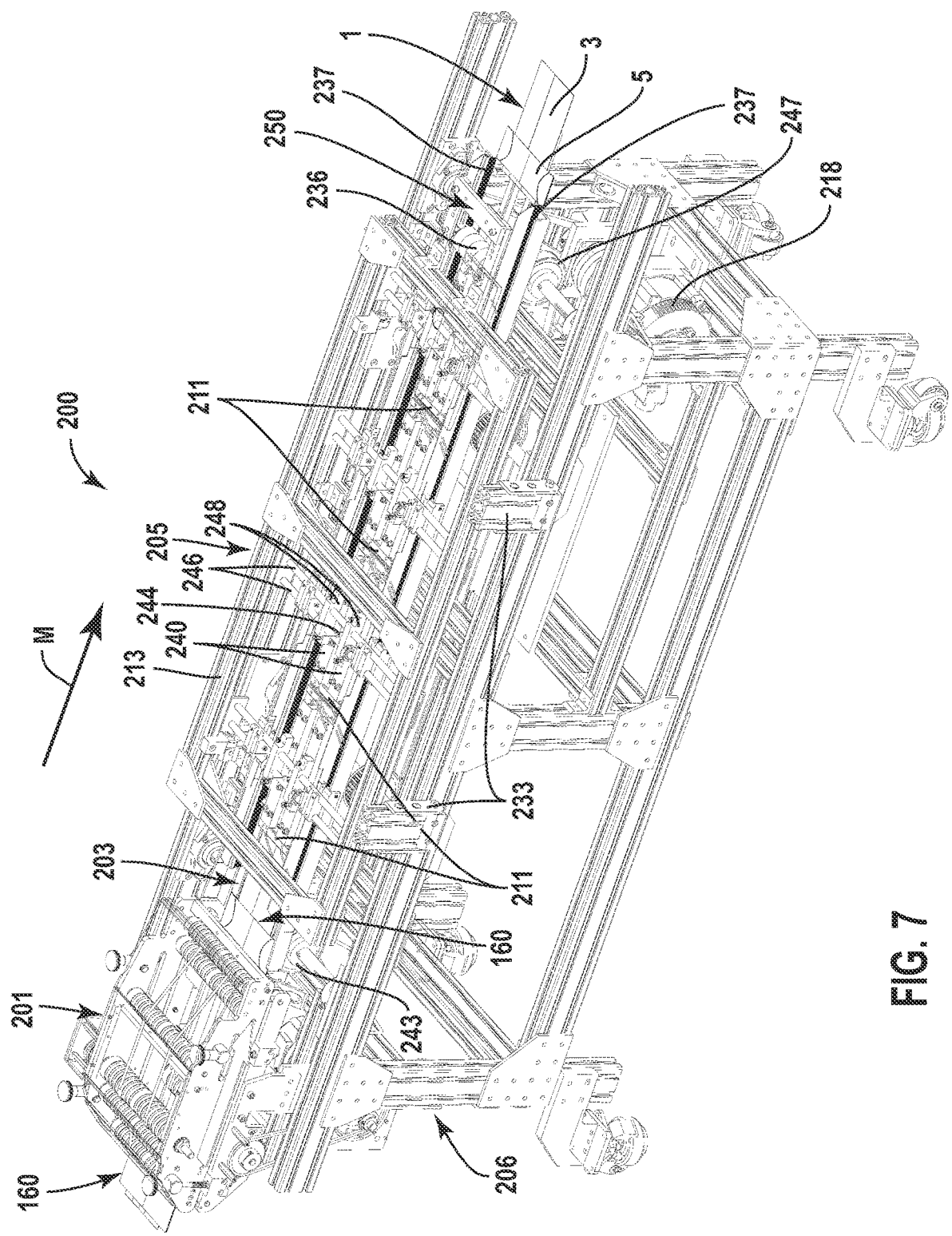
Figure 8:
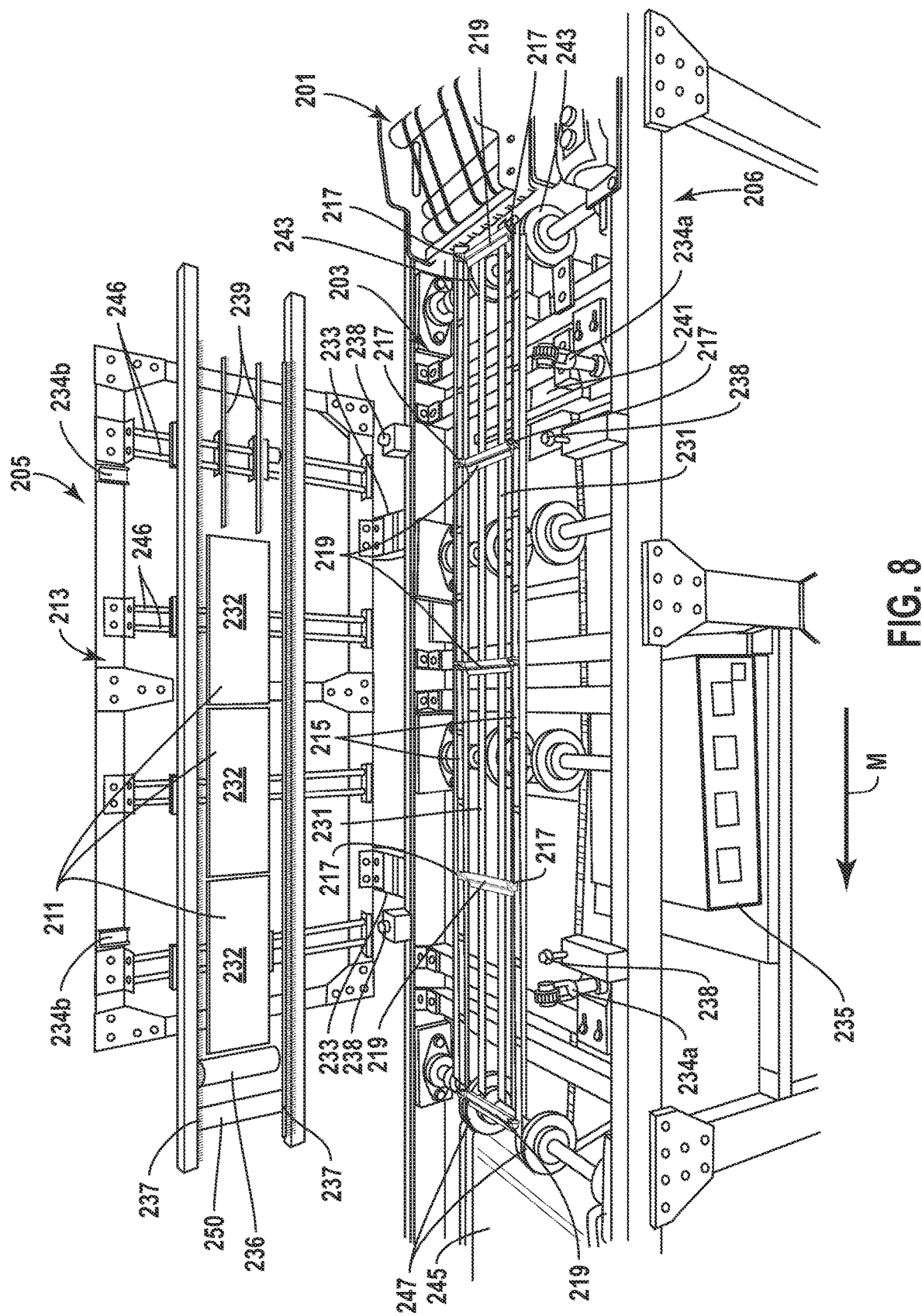
FIG. 8 is a schematic perspective view of the system of FIGS. 6 and 7 in an open configuration according to the exemplary embodiment of the disclosure.

As shown in FIGS. 6-8, the sealing system 200 can include a package feeder 201, a package conveyor 203, and a heating assembly or hot plate assembly 205, each mounted to a base frame 206. In the illustrated embodiment, the package feeder 201 (e.g., FIGS. 6-8) can receive the open-ended packages 160 from the system 100 (e.g., via the belt conveyor 162) or from a stack of packages and can deposit the open-ended packages 160 onto the package conveyor 203. Generally and as described in more detail below, the package conveyor 203 can engage the open-ended packages 160 and move them sequentially past the hot plate assembly 205 for at least partially forming the transverse seal 69 on the tail section 73. In the illustrated embodiment, the hot plate assembly 205 can include one or more heating elements or hot plates 211 mounted on a pivot frame 213, which can pivot from a closed position (e.g., FIGS. 6, 7, and 13) to an open position (e.g., FIG. 8). The open position of the hot plate assembly 205 can facilitate making adjustments to the sealing system 200, as discussed in more detail below.

Figure 9:
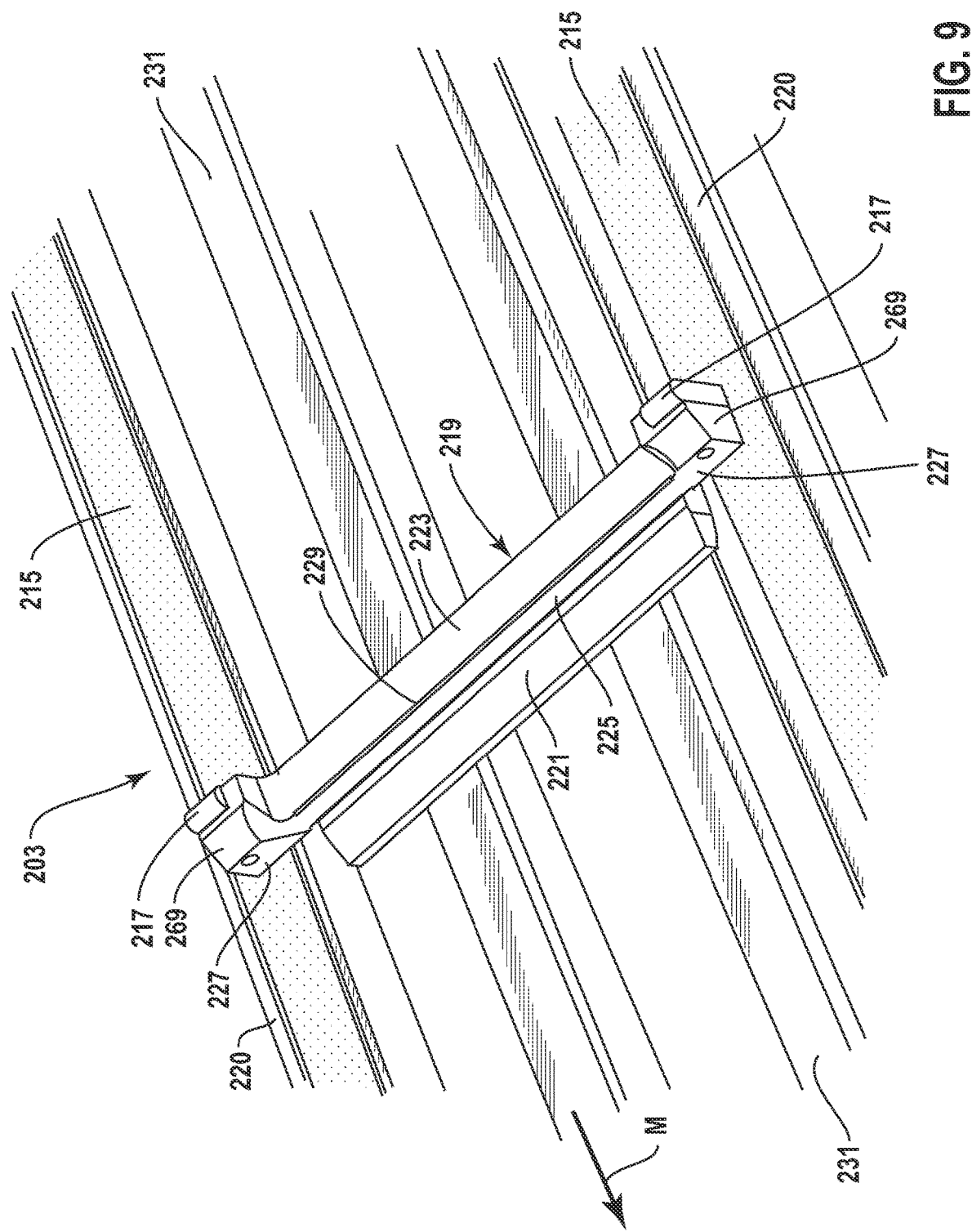
FIG. 9 is a schematic perspective view of a carrier flight of the system of FIGS. 6-8 according to the exemplary embodiment of the disclosure.
Figure 10:
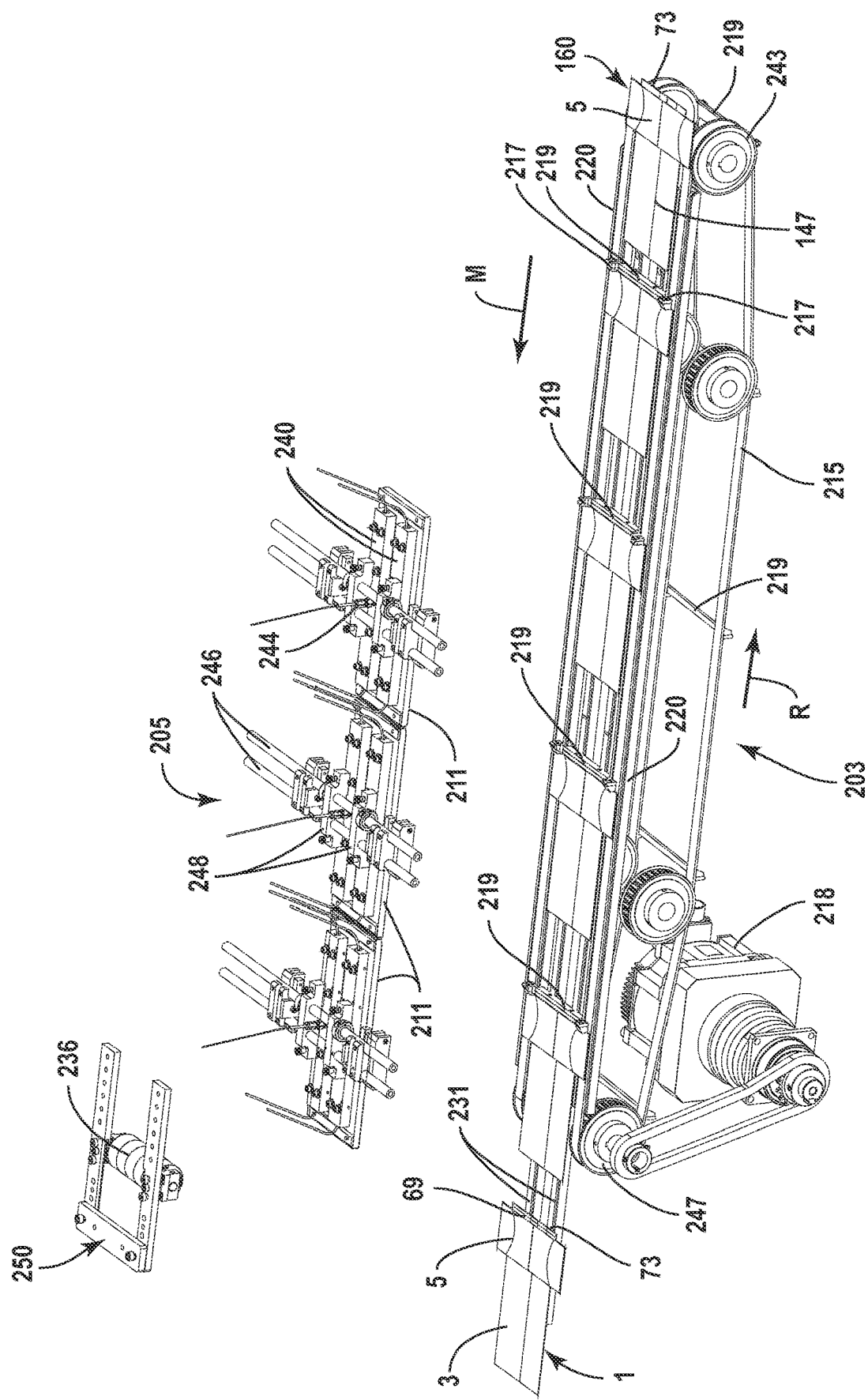
FIG. 10 is a schematic perspective view of a package conveyor, hot plate assembly, and nip roller of the system of FIGS. 6-8 according to the exemplary embodiment of the disclosure.

As shown in FIGS. 8-12, the package conveyor 203 includes two spaced apart lug belts or tracks 215 with pusher lugs 217 for engaging a series of the open-ended packages 160 (FIGS. 10-14) and conveying the open-ended packages in the machine direction M. In one embodiment, the lug belts 215 can be driven by a motor 218, which can be mounted to the base frame 206 (FIGS. 6, 7, and 10). In the illustrated embodiment, the lug belts 215 can be endless belts, each engaging a plurality of wheels, including upstream wheels 243 and downstream wheels 247. As shown in FIG. 10, the downstream wheels 247 can be driven by the motor 218 to move the lug belt 215 on the wheels so that the lug belts 215 move in the machine direction M on the top of the package conveyor 203 and move in a return direction R on a bottom side of the package conveyor 203. In one embodiment, the other wheels can be idler wheels and/or could be driven wheels. In the illustrated embodiment, the lug belts 215 can be supported in support tracks 220 along the top of the package conveyor 203 and between the upstream wheels 243 and the downstream wheels 247. The support tracks 220 can be mounted on the base frame 206 in one embodiment. As shown in FIG. 10, the pusher lugs 217 are spaced along the respective lug belt 215. In one embodiment, the pusher lugs 113 can be spaced on the lug belts 111 by at least the height of the open-ended tube portions 147. As shown in FIGS. 8-15, the package conveyor 203 can include flights 219 such as chain flights 219 for engaging the respective tail sections 73 of the open-ended tube portions 147. Each of the chain flights 219 can extend transverse to the machine direction M from a pusher lug 217 on one of the lug belts 215 to a pusher lug 217 on the other lug belt 215. Accordingly, a flight 219 is associated with each pair of pusher lugs 217 of the lug belts 215 in the illustrated embodiment. In an exemplary embodiment, the chain flight 219 can be affixed to the lugs 217 by fasteners 222 (FIG. 14) or by an adhesive or can be otherwise connected to or integral with the pair of pusher lugs 217.

Figure 12:
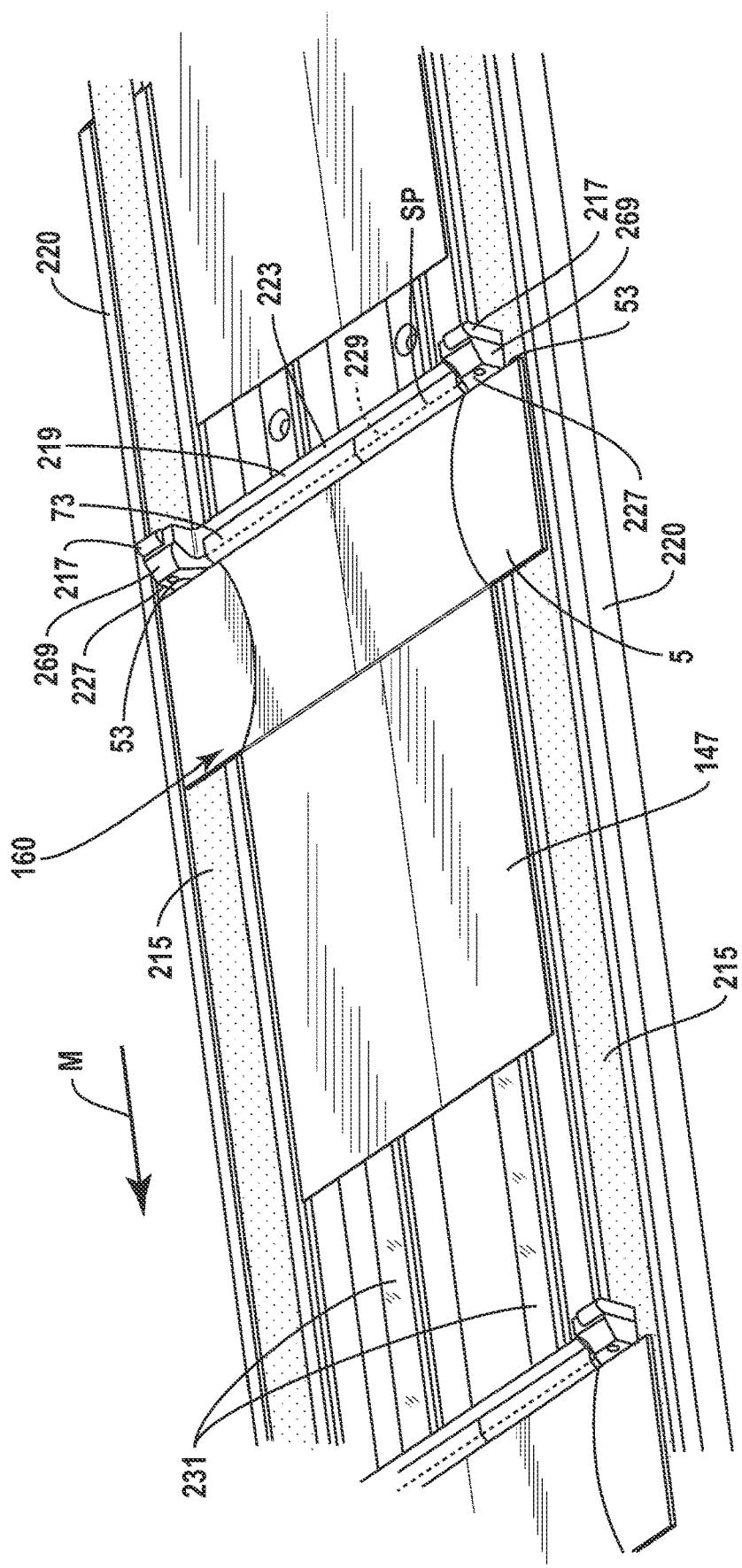
FIG. 12 is a schematic perspective view of a package on the package conveyor and engaging the carrier flight of FIG. 9 according to the exemplary embodiment of the disclosure.
Figure 13:
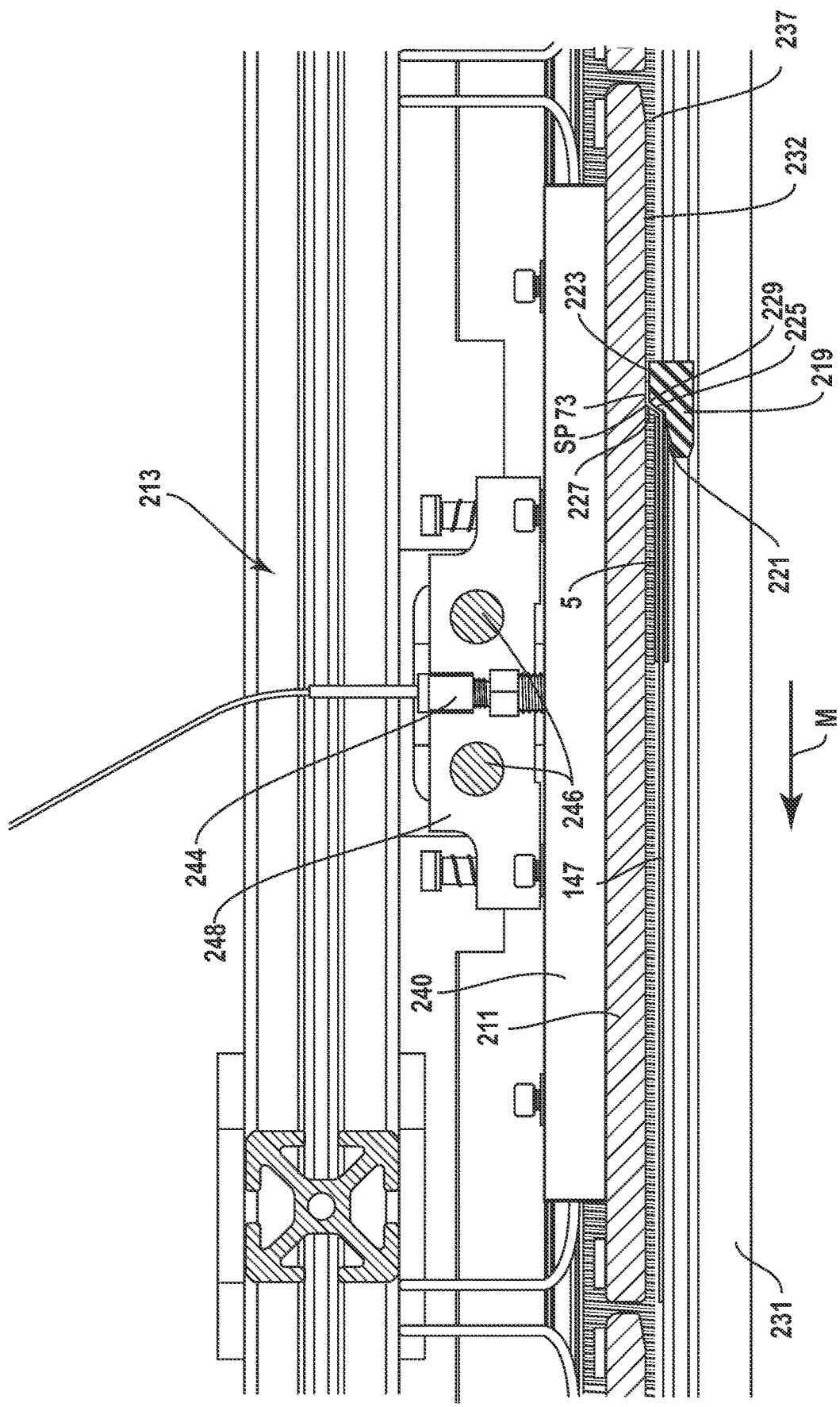
FIG. 13 is a schematic cross-sectional view showing the package engaged between the carrier flight and s hot plate of the hot plate assembly according to the exemplary embodiment of the disclosure.

As shown in FIGS. 9 and 13, the chain flight 219 can have a first, recessed surface 221, a second, upper surface 223, and an oblique surface 225 extending between the recessed surface 221 and the upper surface 223. In the illustrated embodiment, the chain flight 219 can be a metal (e.g., aluminum) or other suitable material that can be heated and that can suitably transfer thermal energy to the tail sections 73, as described in more detail below. In one embodiment, the aluminum of the chain flight 219 can remain exposed for more efficient heat transfer. Alternatively, a protective material (e.g., a tape or fabric) can be applied to the surface of the chain flight 219 to help prevent scuffing of the open-ended packages 160, stickiness between the open-ended packages 160 and the chain flight 219, and/or friction between the open-ended packages 160 and the chain flight 219. For example, the protective material could be polytetrafluoroethylene or any other suitable material (e.g., with a low coefficient of friction). In one embodiment, the length (e.g., the dimension extending transverse to the machine direction M) of the chain flight 219 can be at least equal to the length of the seam 69 to be formed on the tail section 73 (FIGS. 1, 3, and 12). For example, in the case that the seam 69 extends across the entire width of the bag 3 (e.g., as shown in FIGS. 1 and 3), the length of the chain flight 219 can be greater than or equal to the width of the tail section 73 (e.g., as shown in FIG. 12). Also as shown in FIG. 9, the end portions 269 of the chain flights 219 can extend upwardly at either end of the chain flight 219 and can have respective engagement surfaces 227 at their respective downstream sides. As shown in FIGS. 9 and 12, the end portions 269 each can have a notch that receives a respective lug 217 and engages the respective pusher lugs 217 on two sides. The fasteners 222 (FIG. 14) can be threaded fasteners, for example, and can secure the end portions 269 to the respective lugs 217. As shown in FIG. 12, the end portions 269 and the pusher lugs 217 can be spaced apart so that the distance between the end portions 269 is greater than the width of the open-ended tube portion 147, but is less than the width of the sleeve 5. Accordingly, the spacing between the end portions 269 can provide clearance for the open-ended tube portion 147 while the engagement surfaces 227 of the chain flights 219 engage the bottom edge 53 of the sleeve 5 (FIG. 12).

In one embodiment, as shown in FIGS. 12 and 13, the engagement surfaces 227 of the end portions 269 can be generally aligned with the transition between recessed surface 221 and the oblique surface 225 of the chain flight 219 so that the recessed surface 221 can engage the marginal portion of the sleeve 5 adjacent the bottom edge 53, which engages the engagement surfaces 227 of the end portions 269, and the oblique surface 225 and the upper surface 223 can help elevate at least a portion of the tail section 73 relative to the remainder of the open-ended tube portion 147 and the sleeve 5. As shown in FIG. 13, for example, the chain flight 219 can engage the undersurfaces of the sleeve 5 and the tail section 73. In the illustrated embodiment, as shown in FIGS. 12 and 13, the chain flight 219 can include a seal edge 229 configured to engage the undersurface of the tail section 73 at a seal portion SP of the tail section 73, wherein the seal portion SP can comprise the location in the tail section 73 where the seal 69 will be formed. The seal edge 229 is shown in phantom in FIG. 12 where the seal edge is covered by the tail section 73. In one embodiment, the engagement surfaces 227 of the end portions 269 can be spaced from the seal edge 229 of the chain flight 219 according to the desired spacing between the bottom edge 53 of the sleeve 5 and the seam 69 of the bag 3. The seal edge 229 can have a size and shape corresponding to the desired size and shape of the seal 69. For example, the width of the seal edge 229 in the machine direction M can correspond to the thickness of the seal 69. The pusher lugs 217 and/or the chain flights 219 could be omitted or could be otherwise arranged, shaped, positioned, or configured without departing from the scope of the disclosure. For example, the chain flight 219 could be wedge-shaped or could have any other suitable shape.

As shown in FIGS. 8-15, the package conveyor 203 further can include support rails 231 extending in the machine direction M between the lug belts 215 and the support tracks 220. While two support rails 231 are shown in the figures, the package conveyor 203 could include one support rail or any suitable number of support rails or the support rails could be omitted. The support rails 231 can support the open-ended packages 160 and the chain flights 219 as they are moved in the machine direction M by the lug belts 215 (FIGS. 10-14). In one embodiment, each of the support rails 231 has an upper surface that is spaced below the lug belts 215 to help provide clearance for the portions of the open-ended packages 160 that are not engaged by the chain flight 219 to be downwardly spaced from the hot plates 211 as the package conveyor 203 moves the open-ended package 160 past the hot plates 211 (FIG. 13). This configuration can help to avoid unwanted sealing of the bag 3 by allowing the unsealed areas of the bag to be spaced from the hot plates 211 while the open-ended package 160 rests on the support rails. The package conveyor 203, including the lug belts 215, the pusher lugs 217, the chain flights 219, the support tracks 220, the wheels 243, 247, and/or the support rails 231, could be otherwise arranged, shaped, positioned, or configured without departing from the scope of the disclosure.

As shown in FIGS. 7, 8, and 10, the heating assembly 205 can be configured to include four hot plates 211 (e.g., FIG. 7) or three hot plates 211 (e.g., FIGS. 8 and 10) mounted to the pivot frame 213 so that each of the hot plates 211 has a bottom surface 232 (FIGS. 8 and 13) facing at least a portion of the package conveyor 203. As shown in FIGS. 7 and 8, the pivot frame 213 can be mounted to the base frame 206 by hinges 233, which can allow the pivot frame 213 to pivot relative to the base frame 206 between the closed position and the open position. In the illustrated embodiment, additional supports mounted to the base frame 206 and/or the pivot frame 213 opposite to the hinges 233 can support and/or latch the pivot frame 213 in the closed position. As shown in FIGS. 6 and 8, these additional supports can include a pair of lift apparatus 234a, each of which can include a wheel mounted on a clevis, and which can be actuated (e.g., by a pneumatic actuator, hydraulic actuator, motor, or other suitable actuator) to push the pivot frame 213 upwardly on the hinges 233 to facilitate opening of the pivot frame. In one embodiment, the wheel of the lift apparatus 234a can engage respective brackets 234b mounted on the pivot frame 213 when the pivot frame is in a closed position (FIGS. 6 and 7) or a partially closed or partially open position. As shown in FIG. 8, additional supports 238 can be mounted on the base frame 206 to support the pivot frame 213 in the closed position (FIGS. 6 and 7). The pivot frame 213 could be omitted or could be otherwise arranged, shaped, positioned, or configured without departing from the scope of the disclosure. For example, the hot plates 211 could be otherwise supported relative to the package conveyor 203.

As shown in FIGS. 6 and 8, the heating elements or hot plates 211 can be connected to a temperature controller 235 (e.g., via wires), which can be mounted to the base frame 206, for heating the hot plates 211 and maintaining the temperature of the hot plates 211 during the sealing process as described in more detail below. As shown in FIGS. 7, 10, and 13, each of the hot plates 211 can be mounted to two heater elements 240 (e.g., electrical resistance heaters or any other suitable heating elements), which can be powered by the temperature controller 235 to heat the top plates 211 to the desired temperature for sealing the tail sections 73 of the open-ended sleeves 147. A thermocouple 244 can provide feedback to the temperature controller for each hot plate 211 (FIGS. 7, 10, and 13). Each of the heater elements 240 can be mounted to two crossbars 246 by respective brackets 248 and the crossbars 246 can be mounted to the pivot frame 213 to support the hot plates 211 as shown in FIGS. 7, 8, 10, and 13. The hot plates 211 could be otherwise heated and/or mounted to the pivot frame 213 without departing from the disclosure.

As shown in FIGS. 8, 10, 11A, and 11B, the hot plates or heating elements 211 can have a width (e.g., the horizontal dimension that is transverse to the machine direction M) so that they fit between the pusher lugs 217 and so that they are at least as wide as the length of the seam 69 of the bag 3. For example, in the case that the seam 69 extends across the entire width of the bag 3 (e.g., as shown in FIGS. 1 and 3), the width of the hot plates 211 can be greater than or equal to the width of the tail section 73. In one embodiment, a protective material (e.g., a tape or fabric) can be applied to the hot plates 211 (e.g., applied to at least the bottom surfaces 232 of the hot plates 211) to help prevent scuffing of the open-ended packages 160, stickiness between the open-ended packages 160 and the bottom surfaces 232 of the hot plates 211, and/or friction between the open-ended packages 160 and the bottom surfaces 232 of the hot plates 211. For example, the protective material could be polytetrafluoroethylene or any other suitable material (e.g., with a low coefficient of friction). The hot plate assembly 205 could be otherwise arranged, shaped, positioned, or configured without departing from the scope of the disclosure. For example, any suitable number of hot plates 211 could be mounted to the pivot frame 213.

Figure 14:
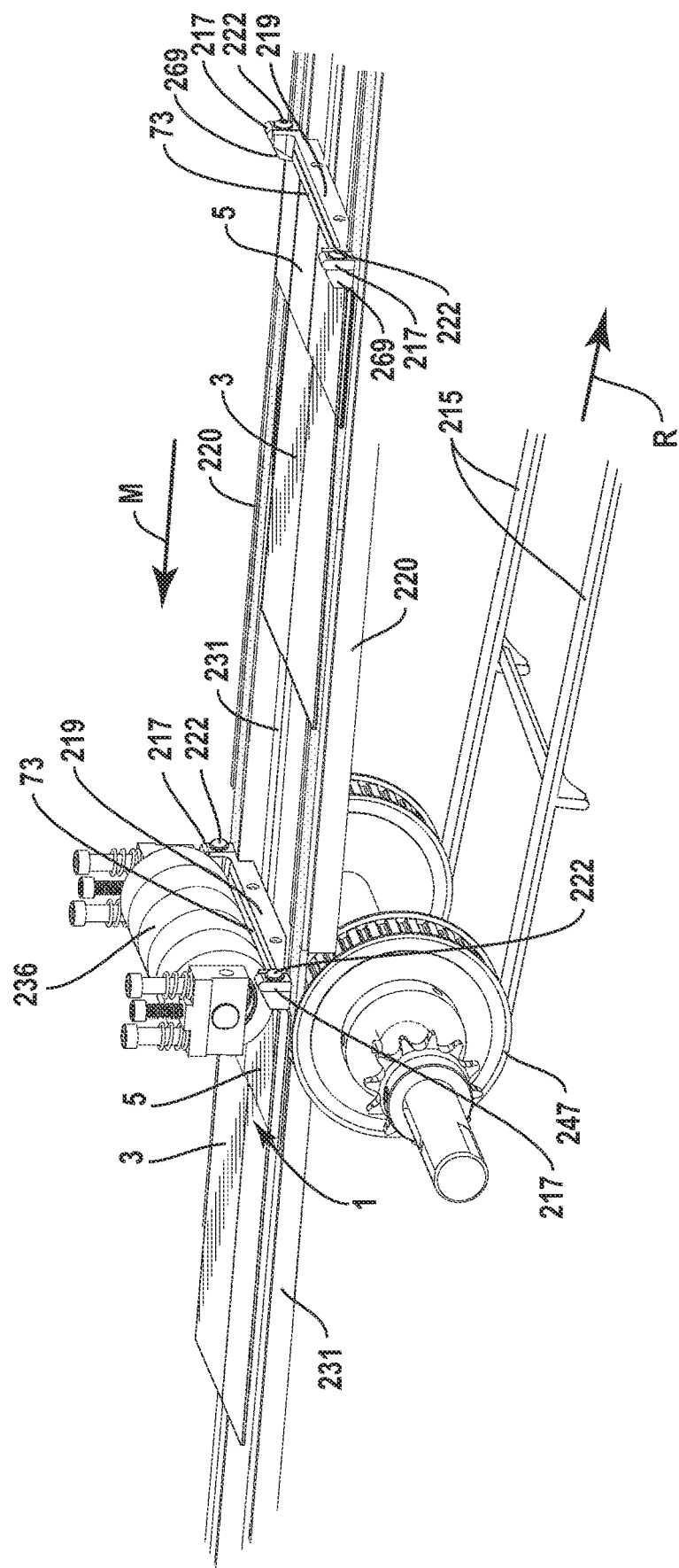
FIG. 14 is a schematic perspective view showing a package engaged between the carrier flight and the nip roller according to the exemplary embodiment of the disclosure.

As shown in FIGS. 7, 8, 10, and 14, a nip roll 236 is mounted to the pivot frame 213 at a downstream end of the heating assembly 205. In one embodiment, the nip roll 236 is mounted to the pivot frame 213 by a nip roll brace 250 (FIGS. 6-8 and 10) so that the nip roll 236 is free to rotate about its axis. In the illustrated embodiment, the nip roll 236 is positioned to extend between the lug belts 215 and the pusher lugs 217 for engaging the tail section 73 as the package conveyor 203 moves the packages in the downstream direction beneath the nip roll 236. In one embodiment, the nip roll 236 can have a length (e.g., in the horizontal direction that is transverse to the machine direction M) that is generally equal to the width of the tail section 73. In an exemplary embodiment, the nip roll 236 is configured so that at least a portion of the tail section 73 is engaged between the surface of the nip roll and the seal edge 229 of the chain flight 219 as the chain flight 219 moves past the nip roll 236 on the lug belts 215 (FIG. 14). In the illustrated embodiment, the nip roll 236 has a compliant covering (e.g., a sleeve or coating) so that the surface of the nip roll 236 can at least partially conform to the portions of the tail section 73 with different thicknesses (e.g., the open-ended sleeve 147 and the bag 3 can have four layers of material where the gussets 60, the central portion 63, and the respective marginal portions 65, 67 overlap; three layers of material where the central portion and the seam 71 overlap; and two layers of material where the central portion 63 overlaps each of the marginal portions 65, 67 between the gussets 60 and the seam 71). The nip roll 236 could be omitted or could be otherwise arranged, shaped, positioned, or configured without departing from the scope of the disclosure.

In the illustrated embodiment, a pair of brushes 237 (e.g., a retention assembly) can be mounted to the pivot frame via the crossbars 246 and can extend in the machine direction M along the lug belts 215 (FIGS. 7, 8, 11A, 11B, and 13). In one embodiment, the brushes 237 can be set outside the pusher lugs 217 and the hot plates 211, and can be spaced apart in the horizontal direction that is transverse to the machine direction M by a distance that is less than the width of the reinforcing sleeves 5. In addition, the brushes 237 can be positioned to engage the upper surfaces of the reinforcing sleeves 5 so that the brushes 237 push down on the reinforcing sleeves 5, which can help push the open-ended packages 160 down against the lug belts 215, the support rails 231, and the chain flights 219 (FIG. 13). Further, the brushes 237 can drag against the reinforcing sleeves 5, which can help maintain the bottom edges 53 of the reinforcing sleeves 5 against the engaging surfaces 227 of the respective pusher lugs 217 as the pusher lugs 217 are moved in the machine direction M by the lug belts 215. Accordingly, as shown in FIG. 13, the brushes 237 can help position the open-ended packages 160 so that only the seal portions SP of the open-ended sleeves 147 are in contact with the heating elements 211 and so that the open-ended packages 160 are properly aligned in the package conveyor 203 as the package conveyor 203 moves the open-ended packages 160 in the downstream direction.

In one embodiment, the brushes 237 can be aligned with outer portions of the respective lug belts 215 so that the lugs 217 and the outer portions 269 of the chain flights 219 can pass immediately inside the brushes 237 or near the inner sides of the brushes 237. In this configuration, the reinforcing sleeves 5 can be pressed between the brushes 237 and the outer portions of the lug belts 215 as the lug belts 215 and the open-ended packages 160 move under the brushes 237 in the machine direction M. In another embodiment, the lug belts 215 can be narrower (e.g., so that the width of the belts corresponds to the width of the lugs 217) and/or the brushes 237 can be mounted outside the widths of the lug belts 215. In this configuration, a static surface can extend under each the brushes so that the open-ended packages 160 can be pressed between the brushes 237 and the static surfaces as the open-ended packages 160, the chain flights 219, the lugs 217, and the lug belts 215 move in the machine direction M. In one example, the static surfaces can be upper surfaces of the support tracks 220 or a static guide that can be similar to the support rails 231 mounted outside the tracks 220. In some embodiments, while the brushes 237 can restrain the open-ended packages 160 against the chain flights 219 by pressing the open-ended packages against the outer portions of the lug belts 215, pressing the open-ended packages 160 between two static features (the brushes 237 and the static surfaces) can better restrain the open-ended packages 160 against the chain flights 219 than pressing the open-ended packages 160 against portions of the moving lug belts 215.

In some embodiments, as shown in FIGS. 8, 11A, and 11B, the system 200 can be configured to include only three hot plates 211 instead of four, and a pair of additional brushes 239 can be positioned inside the brushes 237, upstream from the three hot plates 211 (e.g., approximately where the fourth hot plate 211 is in FIG. 8). The additional brushes 239 can help to align the open-ended packages 160 with the pusher lugs 217 and the chain flights 219 and to seat the open-ended packages 160 on the pusher lugs 217 and the chain flights 219 at the upstream end of the system 200 (FIGS. 11A and 11B). In the illustrated embodiment, the brushes 237, 239 are mounted to the pivot frame 213 via crossbars 246. Any of the brushes 237, 239 could be omitted or could be otherwise arranged, shaped, positioned, or configured without departing from the scope of the disclosure. For example, the brushes 237, 239 could be mounted to the base frame 206 or another suitable feature.

Figure 15:
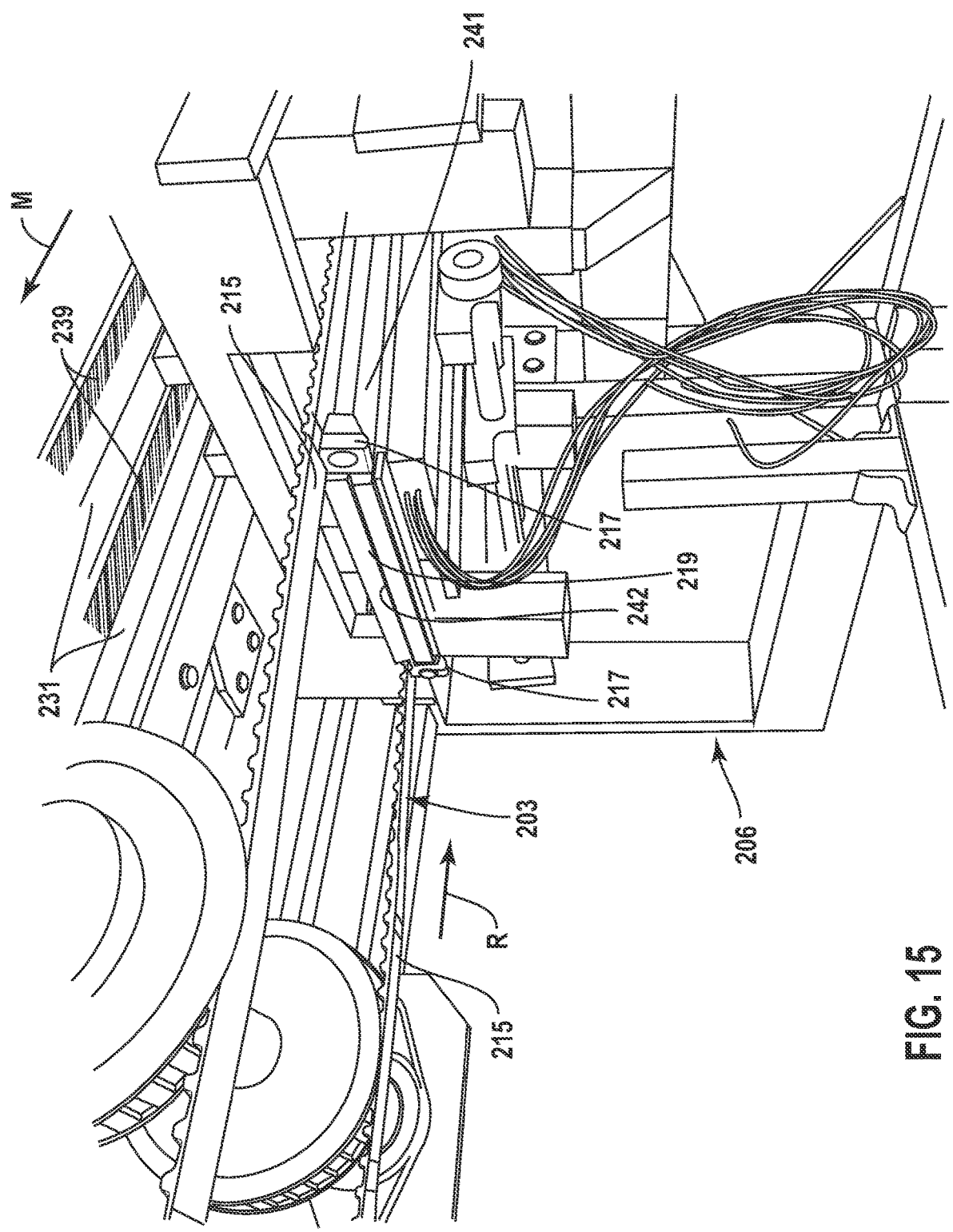
FIG. 15 is a schematic perspective view showing a carrier flight on the package conveyor engaging a pre-heater plate according to the exemplary embodiment of the disclosure.

As shown in FIGS. 8 and 15, the system 200 can include a preheat plate 241 mounted to the base frame 206 so that an upper surface 242 of the preheat plate 241 faces an underside of the upstream end of the package conveyor 203. In one embodiment, the preheat plate 241 can be connected to the temperature controller 235 for heating the preheat plate 241 (e.g., with a heating element) and for monitoring the temperature of the preheat plate 241 (e.g., via a thermocouple). In the illustrated embodiment, the preheat plate 241 is positioned so that the chain flights 219 engage and/or contact the upper surface 242 of the preheat plate 241 as the lug belts 215 move the pusher lugs 217 and the chain flights 219 upstream, in the return direction R (e.g., opposite to the machine direction M) on the return portion (e.g., the underside) of the package conveyor 203. In one embodiment, at least the seal edge 229 of the chain flight 219 can contact the preheat plate 241 for transferring thermal energy from the preheat plate 241 to the chain flight 219. In the illustrated embodiment, the preheat plate 241 can be made of aluminum or another suitable material and can be uncoated and uncovered so that the metal of the chain flight 219 is in contact with the metal of the preheat plate 241 for efficient heat transfer from the preheat plate to the chain flight. Alternatively, a protective material (e.g., a tape or fabric) can be applied to the preheat plate 241 (e.g., applied to at least the upper surface 242 of the preheat plate 241) to help protect the chain flights 219 as they slide along the upper surface 242 of the preheat plate 241. For example, the protective material could be polytetrafluoroethylene or any other suitable material (e.g., with a low coefficient of friction).

In an exemplary embodiment, the preheating of at least the seal edge 229 of the chain flight 219 prior to engaging the tail section 73 of the open-ended tube portion 147 can help reduce the dwell time (e.g., the time of contact between the tail section 73 of the bag 3 with the hot plates 211) needed for forming the seal 69 in the bag 3 such as in locations with more than two layers of material (e.g., the open-ended sleeve 147 and the bag 3 can have four layers of material where the gussets 60, the central portion 63, and the respective marginal portions 65, 67 overlap; three layers of material where the central portion and the seam 71 overlap; and two layers of material where the central portion 63 overlaps each of the marginal portions 65, 67 between the gussets 60 and the seam 71). For example, the preheated seal edge 229 of the chain flight 219 can transfer thermal energy to the undersurface of the tail section 73 that it engages while the hot plates 211 transfer thermal energy to the upper surface of the respective tail section 73 to form the seal 69. In one embodiment, the reduced dwell time can allow the total length of the hot plates 211 to be reduced and/or the speed of the packaging conveyor 203 to be increased and/or can help to reduce overheating of thinner portions of the tail section 73. In one exemplary embodiment, the system 200 that is configured with four hot plates 211 could be reconfigured to include the preheat plate 241 and only three hot plates 211 (FIGS. 8 and 10), which can be replaced by the additional brushes 239 as discussed above. Alternatively, the system 200 could be configured with four hot plates 211 (FIG. 7) and the preheat plate 241. In the illustrated embodiment, the lug belts 215 can carry the pusher lugs 219 and the chain flights 219 upwardly from the preheat plate 241 on upstream guide wheels 243 (FIGS. 8 and 10-11B). The preheat plate 241 could be omitted or could be otherwise arranged, shaped, positioned, or configured without departing from the scope of the disclosure.

In operation, the package feeder 201 can receive the open-ended packages 160 (e.g., with the formed reinforcing sleeve 5 and the attached open-ended tube portion 147) from the system 100 or from another source and can feed the open-ended packages 160 onto the lug belts 215 at the upstream end of the package conveyor 203 (e.g., FIGS. 6-8, 11A, and 11B). In one embodiment, the lug belts 215 can move a pair of the pusher lugs 217 and associated chain flight 219 in the return direction R on the return side of the package conveyor 203 (e.g., on the underside of the package conveyor 203) so that at least the seal edge 229 of the chain flight engages the preheat plate 241 (FIG. 15) and moves along the upper surface 242 of the preheat plate 241 to warm up at least a portion of the chain flight 219. As shown in FIGS. 10-11B, the lug belts 215 can move the pair of pusher lugs 217 and associated chain flight 219 upwardly at the upstream guide wheels 243 while the open-ended package 160 fed from the package feeder 201 (FIGS. 6-8) can be positioned on the lug belts 215 downstream from the pair of pusher lugs 217 and the associated preheated chain flight 219 (FIGS. 10, and 11A). As the lug belts 215 move continuously in the downstream direction, the open-ended package 160 disposed thereon can engage the brushes 237 and/or the brushes 239 (FIG. 11A), which can help keep the open-ended package 160 aligned with the machine direction M and can help prevent the package from moving forward with the lug belts 215 (e.g., due to friction) until the pair of pusher lugs 217 and the associated chain flight 219 catch up to and engage the package (FIG. 11B).

As shown in FIGS. 10-13, the engaging surfaces 227 of the chain flights 219 can engage the bottom edge 53 of the sleeve 5 to push the open-ended package 160 forward against the brushes 237 and/or 239. As shown in FIGS. 12 and 13, when the engaging surfaces 227 engage the bottom edge 53, the chain flight 219 can engage the open-ended package 160 so that the recessed surface 221 of the chain flight 219 engages the undersurface of the sleeve 5 adjacent the bottom edge 53 and at least the seal edge 229 can engage the tail section 73 of the open-ended tube portion 147. In addition to the brushes 237, 239 slowing or stopping the forward movement of the open-ended package 160 until the chain flights 219 engage the sleeve 5, at least the brushes 237 can push downwardly on the upper surface of the sleeve 5, which can help retain the tail section 73 of the open-ended tube portion 147 against the chain flight 219 and can help urge the remainder of the open-ended tube portion 147 downwardly toward the support rails 231 (FIG. 13). Accordingly, in the illustrated embodiment, the tail section 73 engages the oblique surface 225, the upper surface 223, and the seal edge 229 of the chain flight 219 to be raised above the remainder of the open-ended package 160 (FIGS. 12 and 13). As the lug belts 215 continue to move the pusher lugs 217 and the chain flight 219 downstream, the pusher lugs 217 and chain flights 219 can move the open-ended packages 160 in the downstream direction while the brushes 237 help to retain the sleeve 5 in contact with the engaging surfaces 227 and to push the open-ended packages 160 downwardly. As shown in FIG. 13, as the open-ended packages 160 are moved in the machine direction M, they pass under the hot plates 211. In one embodiment, the downward urging on the open-ended packages 160 by the brushes 237 can help keep the portion of the open-ended tube portion 147 that is not to be sealed spaced apart from the bottom surfaces 232 of the hot plates 211 as the open-ended packages 160 move under the hot plates 211 on the package conveyor 203. Accordingly, the brushes 237 can help prevent undesired sealing of the open-ended tube portion 147.

In the illustrated embodiment, the hot plates 211 can be positioned over the package conveyor 203 so that the seal edge 229 of the chain flight 219 urges at least a portion of the tail section 73 against the bottom surfaces 232 of the hot plates 211 as the open-ended packages 160 are moved in the downstream direction M by the package conveyor 203 (FIG. 13). In an exemplary embodiment, the chain flight 219 and the hot plates 211 can be configured to squeeze the tail section 73 therebetween (e.g., the seal edge 229 of the chain flight 219 can press a portion of the tail section 73 against the bottom surfaces 232 of the hot plates 211). In one embodiment, the temperature of the hot plates 211, the number of hot plates 211 included, and the speed of the package conveyor 203 can be coordinated according to the a desired dwell time for forming the seal 69 in the tail section 73 between the seal edge 229 of the chain flight 219 and the bottom surfaces 232 of the hot plates 211. In an exemplary embodiment, the sealing system 200 can be configured with the hot plates heated to approximately 365 degrees Fahrenheit with a dwell time of approximately 0.75 seconds. Further, in this example, the chain flight 219 can be preheated on the preheat plate 241, which can be heated to approximately 170 degrees Fahrenheit. Accordingly, this exemplary configuration of the sealing system 200 can form the seal 69 in the tail section 73, which includes two layers of material (e.g., between the gussets 60) to four layers of material (e.g., at the gussets 60) in the illustrated embodiment. In one embodiment, the parameters of the sealing system 200 can be adjusted to affect the formation of the seal 69 by adding or subtracting hot plates 211 and/or preheat plates 241, using different sized hot plates 211 and/or preheat plate 241, changing the temperature of the hot plates 211 and/or the preheat plate 241, and/or adjusting the speed of the package conveyor 203.

In the illustrated embodiment, as the chain flight 219 presses the portion of the tail section 73 against the bottom surfaces 232 of the hot plates 211 and as the package conveyor 203 moves the open-ended package 160 in the machine direction M, the upper surface of the tail section 73 slides along the bottom surfaces 232 (FIG. 13) so that the heat of the hot plates 211 on the upper surface of the tail section 73, the heat of the preheated chain flights 219 on the bottom surface of the tail section 73, and the pressure between the hot plates 211 and the chain flight 219 on the tail section 73 can cause the contacting inner surfaces of the open-ended tube portion 147 (e.g., coated with polyethylene or another suitable heat seal material) to soften and at least partially melt to a molten state by the time the tail section 73 and the chain flight 219 reach the end of the last hot plate 211. As shown in FIG. 14, as the tail section 73 passes by the downstream end of the last hot plate 211, at least the seal portion SP of the tail section 73 that will include the seal 69 contacts the surface of the nip roll 236 and the seal edge 229 of the chain flight 219 presses the tail section 73 against the nip roll 236. In one embodiment, the nip roll 236 rotates as the chain flight 219 and the tail section 73 move in the downstream direction M under the nip roll 236 and the compliant cover of the nip roll 236 at least partially conforms to the shape of the tail section to accommodate the different thicknesses of the different portions of the tail section (e.g., the tail section 73 can be thicker at the gussets 60 and the seam 71 than at its other portions). Accordingly, the nip roll 236 can apply sealing nip pressure across the entire width or substantially the entire width of the tail section 73 against the chain flight 219 to cause the softened and/or molten coated inner surfaces of the tail section 73 to at least partially fuse together to form the seal 69.

In one embodiment, the open-ended tube portion 147 is formed into the bag 3 by the at least partial fusing of the inner surfaces of the seal portion of the tail section 73 to form the seal 69, with the closed end 9 (FIGS. 1, 3, 4, and 10), and the resultant reinforced package 1 is output onto an output conveyor 245 (FIGS. 6 and 8) as the pusher lugs 217 and the chain flight 219 are carried downwardly on two downstream guide wheels 247 (FIGS. 7, 8, 10, and 14) to be returned to the upstream end of the package conveyor 203 on the underside of the package conveyor 203. In one embodiment, the output conveyor 245 can transport the reinforced packages 1 for collection, further handling or processing, storage, and/or shipping to a customer.

As shown in FIG. 8, the pivot frame 213 can be pivoted to the open position at the hinges 233 to allow retooling or other adjustments to the sealing system 200. For example, the sealing system 200 can be modified to change the number and/or spacing of the pusher lugs 217 and chain flights 219, to change the number and/or size of the hot plates 211 and/or the brushes 237, 239, and/or to change other features while the pivot frame 213 is in the open position. In one embodiment, the open position of the pivot frame 213 can help make adjustments to the sealing system easier by providing access to the heating assembly 205 and the package conveyor 203, which are less accessible in the closed position of the pivot frame 213 due to their location between the pivot frame 213 and the base frame 206. In the illustrated embodiment, the pivot frame 213 can be pivoted at the hinges 233 to close the sealing system 200 and prepare the system for operation. As shown in FIG. 13, as the pivot frame 213 is moved to the closed position, the hot plates 211 move toward the package conveyor 203 so that the bottom surfaces 232 of the hot plates 211 engage at least the seal surfaces 229 of the chain flights 219 so that portions of the tail section 73 of the open-ended tube portion 147 is pressed between the bottom surfaces 232 and the respective chain flight 219 during operation of the sealing system 200 as described above.

The sealing system could be otherwise arranged, shaped, positioned, or configured without departing from the scope of the disclosure and the reinforced packages 1 could be otherwise formed without departing from the scope of the disclosure. For example, the sealing system 200 could be incorporated into the system 100 (e.g., before the cutting assembly 151) in an alternative embodiment.

Generally, as described herein, bags can be formed from a paper stock material, although various plastic or other bag materials also can be used, and can be lined or coated with a desired material. The reinforcing sleeves described herein can be made from a more rigid material such as a clay-coated natural kraft ("CCNK"). Other materials such various card-stock, paper, plastic or other synthetic or natural materials also can be used to form the components of the packages described herein.

In general, the blanks of the present disclosure may be constructed from paperboard having a caliper so that it is heavier and more rigid than ordinary paper. The blank can also be constructed of other materials, such as cardboard, or any other material having properties suitable for enabling the carton to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding there along. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of sealing reinforced packages, the method comprising:
   moving an open-ended package in a downstream direction on a package conveyor, the open-ended package including a reinforcement sleeve attached to a tube portion so that a tail section of the tube portion extends from an edge of the reinforcement sleeve and comprises a seal portion, the moving the open-ended package comprising engaging the open-ended package with a flight of the package conveyor moving in the downstream direction;
   forming a bag with a closed end by engaging at least the seal portion of tube portion between the flight of the package conveyor and a heating element positioned adjacent the package conveyor, the flight moving with the tail section in the downstream direction relative to the heating element, the forming the bag comprising transferring thermal energy from at least the heating element to the tail section to at least partially form a seal along the seal portion in the tail section to at least partially form the closed end of the bag.

2. The method of claim 1, wherein the transferring thermal energy from at least the heating element to the tail section is during the engaging at least the seal portion of the tail section between the flight and the heating element.

3. The method of claim 1, wherein the tube portion is oriented so that the tail section is disposed upstream from the reinforcement sleeve.

4. The method of claim 1, wherein the flight comprises a recessed surface that at least partially engages the reinforcement sleeve.

5. The method of claim 4, wherein the flight comprises a seal edge that at least partially engages the seal portion of the tail section, the seal edge is spaced upwardly from the recessed surface so that at least the seal portion of the tail section is elevated with respect to the recessed surface, the engaging at least the seal portion between the flight and the heating element comprises engaging at least the seal portion of the tail section between the seal edge and a bottom surface of heating element.

6. The method of claim 1, further comprising retaining the open-ended package in engagement with the flight by engaging a retention apparatus with the open-ended package.

7. The method of claim 6, wherein the retention apparatus presses downwardly on at least a portion of the reinforcement sleeve so that at least the reinforcement sleeve is spaced downwardly from the heating element.

8. The method of claim 6, wherein the retention apparatus comprises at least a brush that drags against at least the reinforcement sleeve as the package conveyor moves the open-ended package in the downstream direction to at least partially retain the open-ended package in engagement with the flight.

9. The method of claim 1, wherein the package conveyor comprises two spaced lug belts, a lug extends from each of the lug belts, and the flight is mounted to the lugs so that the flight extends between the lug belts.

10. The method of claim 9, wherein the tail section of the open-ended package engages the flight between the lugs, portions of the reinforcement sleeve extend over the lug belts downstream from the lugs, and the moving the open-ended package in the downstream direction on the package conveyor comprises engaging the edge of the reinforcement sleeve with an engagement surface of the flight as the flight is moved in the downstream direction by the lug belts via the lugs.

11. The method of claim 10, further comprising retaining the edge of the reinforcement sleeve in engagement with the engagement surfaces of the flight with a retention apparatus, wherein the retention apparatus comprises at least a brush mounted along the downstream direction, the retaining the edge of the reinforcement sleeve in engagement with the engagement surfaces of the flight comprising engaging the reinforcement sleeve with the brush so that the brush drags against the reinforcement sleeve as the package conveyor moves the open-ended package in the downstream direction.

12. The method of claim 10, further comprising retaining the edge of the reinforcement sleeve in engagement with the engagement surfaces of the flight with a retention apparatus, wherein the seal portion of the tail section engages the flight along a seal edge that is spaced upwardly from the lug belts, and the retaining the edge of the reinforcement sleeve in engagement with the engagement surfaces of the flight comprises pressing downwardly on the reinforcement sleeve against the lug belts with the retention apparatus so that the seal portion of the tail section is spaced upwardly from the reinforcement sleeve.

13. The method of claim 1, wherein the heating element is one of a plurality of hot plates mounted along the downstream direction above the packaging conveyor and the engaging at least the seal portion of the tail section between the flight and the heating element comprises engaging at least the seal portion between the flight and each hot plate of the plurality of hot plates as the package conveyor moves the open-ended package in the downstream direction.

14. The method of claim 1, further comprising preheating the flight by engaging the flight with a preheat plate at an upstream end of the package conveyor prior to the engaging the open-ended package with the flight.

15. The method of claim 1, further comprising nipping at least the seal portion of the tail section between the flight and a nip roller, the nip roller being positioned downstream from the heating element.

16. A system for sealing reinforced packages, the system comprising:
 a package conveyor comprising a flight moving in a downstream direction, the flight engaging an open-ended package received by the package conveyor and moving the open-ended package in the downstream direction, the open-ended package including a reinforcement sleeve attached to a tube portion so that a tail section of the tube portion extends from an edge of the reinforcement sleeve and comprises a seal portion; and
 a heating assembly comprising a heating element positioned adjacent at least a portion of the package conveyor so that at least the seal portion of the tube portion is engaged between the flight and the heating element when the package conveyor moves the open-ended package in the downstream direction, wherein the heating element is at least partially heated for transferring thermal energy to the tail section for at least partially forming a seal in the tail section.

17. The system of claim 16, wherein the flight comprises a recessed surface that at least partially engages the reinforcement sleeve.

18. The system of claim 17, wherein the flight comprises a seal edge that at least partially engages the seal portion of the tail section, the seal edge is spaced upwardly from the recessed surface so that at least the seal portion of the tail section is elevated with respect to the recessed surface, and the seal portion of the tail section is engaged between the seal edge and a bottom surface of the heating element as the package conveyor moves the open-ended package in the downstream direction.

19. The system of claim 16, further comprising a retention apparatus that engages the open-ended package to at least partially retain the open-ended package in engagement with the flight.

20. The system of claim 19, wherein the retention apparatus presses downwardly on at least a portion of the reinforcement sleeve so that at least the reinforcement sleeve is spaced downwardly from the heating element.

21. The system of claim 19, wherein the retention apparatus comprises at least a brush that drags against at least the reinforcement sleeve as the package conveyor moves the open-ended package in the downstream direction to at least partially retain the open-ended package in engagement with the flight.

22. The system of claim 16, wherein the package conveyor comprises two spaced lug belts, a lug extends from each of the lug belts, and the flight is mounted to the lugs so that the flight extends between the lug belts.

23. The system of claim 22, wherein the tail section of the open-ended package engages the flight between the lugs, portions of the reinforcement sleeve extend over the lug belts downstream from the lugs, and the edge of the reinforcement sleeve engages an engagement surface of the flight as the flight is moved in the downstream direction by the lug belts via the lugs.

24. The system of claim 23, further comprising a retention apparatus that retains the edge of the reinforcement sleeve in engagement with the engagement surfaces of the flight, wherein the retention apparatus comprises at least a brush mounted along the downstream direction, the brush engaging the reinforcement sleeve and drags against the reinforcement sleeve as the package conveyor moves the open-ended package in the downstream direction.

25. The system of claim 23, further comprising a retention apparatus that retains the edge of the reinforcement sleeve in engagement with the engagement surfaces of the flight, wherein a seal edge of the flight engages the seal portion of the tail section, the seal edge is spaced upwardly from the lug belts, and the retention apparatus presses downwardly on the reinforcement sleeve against the lug belts so that the seal portion of the tail section is spaced upwardly from the reinforcement sleeve.

26. The system of claim 16, wherein the heating element is one of a plurality of hot plates mounted along the downstream direction above the packaging conveyor and the seal portion is engaged between the flight and each hot plate of the plurality of hot plates as the package conveyor moves the open-ended package in the downstream direction.

27. The system of claim 16, further comprising a preheat plate at an upstream end of the package conveyor, the preheat plate being positioned to engage the flight for preheating the flight.

28. The system of claim 16, further comprising a nip roller positioned downstream from the heating element for engaging at least a portion of the tail section when the tail section is in engagement with the flight as the package conveyor moves the open-ended package in the downstream direction for nipping at least the seal portion of the tail section between the nip roller and the flight.

29. The system of claim 16, wherein the package conveyor is mounted to a base frame and the heating element is mounted to a pivot frame, and the pivot frame is mounted to the base frame at least a hinge so that the pivot frame is pivotable away from the package conveyor.

* * * * *